United States Patent [19]

Byrne et al.

[11] Patent Number: 4,698,537

[45] Date of Patent: Oct. 6, 1987

[54] ELECTRICAL DRIVE SYSTEMS INCORPORATING VARIABLE RELUCTANCE MOTORS

[75] Inventors: John V. Byrne, Dublin; Jeremiah B. O'Dwyer, Kildare, both of Ireland

[73] Assignee: Kollmorgen Technologies Corporation, Dallas, Tex.

[21] Appl. No.: 816,867

[22] Filed: Jan. 7, 1986

[30] Foreign Application Priority Data

Jan. 15, 1985 [IE] Ireland .................................. 93/85

[51] Int. Cl.$^4$ .......................................... H02K 17/12
[52] U.S. Cl. .................................. 310/168; 318/138; 310/254; 310/269
[58] Field of Search ............... 310/162, 163, 164, 166, 310/168, 172, 186, 190, 193, 216, 261, 268, 269

[56] References Cited

U.S. PATENT DOCUMENTS

| | | | |
|---|---|---|---|
| 1,883,885 | 10/1932 | Durst | 310/190 |
| 2,630,561 | 3/1953 | Mueller | 310/261 |
| 3,062,979 | 11/1962 | Jarret | 310/168 |
| 3,956,678 | 5/1976 | Byrne et al. | 310/168 |
| 3,991,332 | 11/1976 | Kawamura et al. | 310/162 |
| 4,074,160 | 2/1978 | Broadway | 310/162 |
| 4,496,887 | 1/1985 | Ichihara et al. | 318/254 |

FOREIGN PATENT DOCUMENTS

| | | | |
|---|---|---|---|
| 0105851 | 4/1984 | European Pat. Off. | |
| 0108732 | 5/1984 | European Pat. Off. | |
| 1255935 | 12/1967 | Fed. Rep. of Germany | 310/261 |
| 2030789 | 6/1970 | Fed. Rep. of Germany | |
| 1105767 | 3/1968 | United Kingdom | |
| 1321110 | 6/1973 | United Kingdom | |

OTHER PUBLICATIONS

"Electric Machinery", Third Edition, Fitzgerald et al.; McGraw-Hill, 1961, pp. 506-509.
"Electrical Machines and Their Applications", Second Edition; Hindmarsh; Pergamon, 1970, pp. 536-539.
Siemens Ferrites Data Book, 1979/80.
Philips Data Hand Book C5, 1985.
IEE International Conference on Power Electronics and Variable Speed Drives, May 1984; Ray, Lawrenson et al., "Industrial Switched Reluctance Drives—Concepts and Performance".

(List continued on next page.)

*Primary Examiner*—Patrick R. Salce
*Assistant Examiner*—D. L. Rebsch
*Attorney, Agent, or Firm*—Morgan & Finnegan

[57] ABSTRACT

In a two-phase salient pole variable reluctance motor in which the number of stator poles is four or a multiple of four, alternate stator poles carry windings of different phases and each stator pole has an elongated pole shoe, so that the pole tips of each adjacent pair of stator poles are closely spaced. Each rotor pole has an iron depletion layer in the vicinity of its poleface surface which defines a saturating zone, across which the greater part of the magnetomotive force produced by stator windings is developed by uniform flux build-up with rotor angle throughout almost the entire duration of pole overlap. A working stroke approximating a stator pole pitch is achieved. The circumferential extent of each rotor pole is matched to that of the stator poles so that when the rotor poles are fully aligned with a pair of stator poles, each rotor poletip is located in the vicinity of a pair of spaced apart stator pole tips, the relative disposition of the pole tips being such that when both phases of the motor are then simultaneously excited, fringing flux passes through the rotor poletips, this flux being relatively strong for one poletip of each rotor pole and relatively weak for the other poletip. When the rotor poles are initially positioned so that there is partial overlap between rotor and stator poles, the motor is started by a conventional reluctance motor phase sequence, but when the rotor poles are initially fully aligned with stator poles, in which position neither phase acting alone is capable of producing torque, both phases are excited simultaneously, so that torque is applied to the rotor by the flux asymmetry to move the rotor into normal phase energization. The motor is bi-directional and self-starting in both senses from any rotor position.

13 Claims, 30 Drawing Figures

OTHER PUBLICATIONS

Motor Con, Oct. 1985, Torrey and Lange, "Progress on the Development of a 60-kw Variable-Reluctance Motor Drive for Electric Vehicle Propulsion".

International Conference on Electrical Machines, Athens, Sep. 1980, Lawrenson et al: "Switched Reluctance Motors for Traction Drives",.

Motor-Con, Oct. 1985; Byrne et al: "A High Performance Variable Reluctance Drive: A New Brushless Servo".

Proc. IEE Conference on Variable Speed Drives, Sep. 1979; Bolton and Pedder: "Low-Cost Reluctance Drive System for Low Power, Low Speed Application".

Power Division of the Institution of Electrical Engineers, Second International Conference on Small and Special Electrical Machines, Sep. 1981; Chatractana, Bolton and Pedder: "Investigations Into Small Single-Phase Switched Reluctance Motors".

| DESIRED DIRECTION OF ROTATION | CENTRE LINE 301 OF POLE STOPPED IN SECTOR n | PHASE ENERGISATION SEQUENCE |
|---|---|---|
| FORWARDS (CLOCKWISE) | 1 | a−b−a−b...... |
| | 1/2 | a+b−b−a−b..... |
| | 2 | b−a−b−a...... |
| | 2/1 | a+b−['a']−b−a..... |
| REVERSE (COUNTER-CLOCKWISE) | 1 | b−a−b−a...... |
| | 1/2 | a+b−['b']−a−b.... |
| | 2 | a−b−a−b...... |
| | 2/1 | a+b−a−b−a...... |

*Fig. 20.*

ELECTRICAL DRIVE SYSTEMS INCORPORATING VARIABLE RELUCTANCE MOTORS

BACKGROUND OF THE INVENTION

1. Field of the Invention

The present invention relates to electrical drive systems. In particular, the invention relates to electrical drive systems incorporating variable reluctance electric motors. The invention also relates to variable reluctance motors per se and in particular to two-phase constructions of such motors.

2. Description of the Prior Art

In a variable reluctance machine, high permeability ferromagnetic stationary and moving parts having pole surfaces separated by the smallest airgap consistent with mechanical clearance may be arranged to form magnetic paths of low reluctance except for highly saturated constriction zones determined by the overlap between the poles, so that the magnetic flux is determined primarily by the position of the moving part and as little as possible by the intensity of the excitation current or currents. The theory underlying the functioning of variable reluctance machines is discussed in the following papers: "Tangential forces in overlapped pole geometries incorporating ideally saturable material", John V. Byrne, IEEE Transactions on Magnetics, Vol. Mag-8, No. 1, March 1972; "Saturable overlapping rectangular poles", John V. Byrne and William J. O'-Connor, IEEE Annals No. 509MA923-3, 1975; and "Magnetic forces in idealised saturable-pole configurations", William J. O'Connor, IEE Proc., Vol. 127, Pt.B, No. 1, Jan. 1980.

In a multi-phase construction of a variable reluctance motor, such as is described in U.S. Pat. No. 3,956,678 of Byrne et al, this constriction zone may be located at or adjacent to the overlapping poleface surfaces of one or both of the relatively displaceable parts of the machine by dimensioning the machine so that the cross-sectional area of the ferromagnetic material in the flux path at the variable interface in the poleface region is less than the cross-section available to magnetic flux elsewhere in the flux path, throughout the working stroke. The working stroke is determined by the extent of the relative mechanical displacement of the stationary and moving parts during which a substantially uniform rate of flux increase prevails, i.e. the displacement increment during which the cross-sectional area of the flux path at the constriction zone continues to increase, and it terminates when the increase in the cross-sectional area of the flux path ceases. In such multi-phase constructions of a reluctance motor, the area of the stator pole face is generally less than or substantially equal to the cross-section available for flux at the waist of the pole, i.e. the region of the pole extending circumferentially between the winding spaces in a rotational machine construction and joining the stator poleface region to the stator yoke. In some arrangements, the stator poleface area may somewhat exceed the waist area, but the constriction may remain defined at the overlap by means of, for example, rotor pole skewing, so that the area available for the flux path in the rotor pole remains less than the waist area of the stator pole, right up to full pole overlap. Thus, mechanical limitations on the length of the working stroke are imposed by the various design constraints of reluctance machines, even in the case of variants such as those incorporating rotor skewing. In three or four phase machines, these constraints need not be of major significance, in that the proliferation of phases means that another phase is always ready to take over rotor drive as the working stroke of a particular pair of cooperating rotor and stator poles comes to an end. Thus torque continuity is assured and the machine may be started in either direction from any rotor position. This is not, however, the case for a reluctance motor having less than three phases, and while self-start may be achieved by extending the arcuate extent of the rotor poles, as described in U.S. Pat. No. 3,956,678 of Byrne et al, the resulting configuration is limited to continuous torque in a single preferred direction of rotation.

While three and four phase reluctance motors are of their nature self-starting, the control circuit complexity and cost necessitated by the use of three phases generally shows no clear cost advantage over a comparable induction motor system. Neither is there usually any reduction in the total kVA rating of the power semiconductor devices needed for the reluctance motor control circuit. In the case of four-phase constructions of reluctance motors, the control circuit complexity and cost are greater again than the requirements for the three-phase configuration.

In said U.S. Pat. No. 3,956,678 of Byrne et al, a two-phase reluctance motor system is described, in which a working stroke of 90° per phase is achieved by making each rotor poleface arc 100°, while retaining a relatively conventional stator poleface arc of 50°. Thus the angular extent of the rotor poleface surface is approximately twice that of the stator poleface. In order to provide the required flux constriction zone at the variable interface, approximately one-half of the rotor poleface surface is underlaid or backed by an iron depletion region, this region being defined by trapezoidal slots in the arrangement particularly described in the specification. This configuration enables the required linear increase of flux with rotation to continue over virtually the full extent of pole relative displacement until the rotor pole portion of full or undepleted iron density comes substantially into full alignment with the stator pole, magnetic saturation being confined to the neighborhood of the mechanically variable interface or overlap between the stator and rotor poles. The region of depleted iron density thus forms a leading edge region of the rotor pole during normal operation of the motor described. As this region begins to overlap the stator pole, flux starts to increase in linear dependence on rotor angular displacement. The depleted region is sized so that when it comes into full alignment with the stator pole, the flux level is approximately one-half of its maximum value. Flux then continues to build up linearly towards its maximum as further rotation of the rotor brings the rotor pole portion of full or undepleted iron density into substantially full overlap with the stator pole. This machine is self-starting in a direction corresponding to said regions of depleted iron density being leading edge regions of the rotor poles during rotor rotation. The self-starting facility is achieved by the asymmetrical extension of the rotor poles necessary for the exploitation of saturation in the machine.

More recently, a paper by J. C. Compter, of Philips Research Laboratories, Eindhoven, The Netherlands, entitlted "Microprocessor-Controlled Single-Phase Reluctance Motor", described a single-phase reluctance machine suitable for high speed applications in the power range up to approximately one horsepower.

Such motors may be used in, for example, vacuum cleaners and portable tools. In these applications, the reluctance machine may exhibit clear advantages over the motors conventionally used in such products, for example, as series commutator motors. In the arrangement described by Compter, the rotor is held in a position favorable for starting by a small permanent magnet. Start-up and speed control are microprocessor-controlled. The costs entailed by this aspect of the system are claimed to be justified by virtue of the simplification of the power circuit, this requiring just one main switching device.

BRIEF SUMMARY OF THE INVENTION

It is an object of the present invention to provide a reversible variable reluctance motor drive, capable of self-starting irrespective of rotor position. It is a further objective of the invention to provide such a motor in a two-phase construction, and thereby to achieve economies in semi-conductor device usage and cost, by comparison with induction motor alternatives. It is yet another object of the invention to provide an electrical drive system incorporating a two-phase variable reluctance motor having favorable or acceptable noise and vibration characteristics. A still further object of the invention relates to the provision of an electrical drive system incorporating a two-phase variable reluctance motor applicable to industrial variable-speed usage in the power range up to tens to kilowatts. Yet another object of the invention is to provide a drive system of this kind suitable for very high speed applications.

According to the invention, there is provided a two-phase variable reluctance motor, comprising a stationary or driving member having a plurality of salient driving poles, the number of said poles being four or a multiple of four, a magnetizing winding for each driving pole, each said magnetizing winding being either a first phase winding or a second phase winding, and alternate driving poles having windings of different phases so that the driving poles neighboring each driving pole carrying a first place winding each carry a winding of the second phase and the driving poles neighboring each pole carrying a second phase winding each carry a winding of the first phase, and a movable or driven member having a plurality of movable or driven poles, the number of said driven poles being one-half of the number of driving poles, each driving pole having a poleface region, the extent of which in the direction of relative displacement of said driving and driven poles approaches the driving pole pitch, so that each poletip portion of each driving pole is disposed at a spacing in said direction of relative displacement of said driving and driven poles from a poletip portion of an adjacent driving pole, the minimum said spacing of said poletip portions being relatively short compared with the extent of the driving pole poleface regions in said direction of relative displacement, each driven pole having a saturating zone extending in said direction of relative displacement and defining a constriction in the path presented to magnetic flux in operation of the motor, so that the greater part of the magnetomotive force produced by energization of a driving member magnetizing winding may be developed across said saturating zone, and each driven pole having a poleface region, the extent of which in said direction of relative displacement is related to that of the driving pole poleface regions, so that each poletip portion of a driven pole which is in alignment with a driving pole is disposed in the vicinity of both a poletip portion of said aligned driving pole and the poletip portion spaced therefrom of a driving pole neighboring said aligned driving pole, for the passage of fringing flux through said poletip portions of the driven pole on simultaneous excitation of said first and second phases, said fringing flux being relatively strong for the driven poletip portion in the vicinity of the poletip portions of driving poles of opposite polarity and being relatively weak for the driven poletip portion in the vicinity of the poletip portions of driving poles of the same polarity.

The invention is especially directed to a rotational construction of two-phase variable reluctance motor, comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extent of the stator poleface regions, each rotor pole having a circumferentially extending saturating zone defining a constriction in the path presented to magnetic flux in operation of the motor, so that the greater part of the magnetomotive force produced by energization of a stator magnetizing winding may be developed across said saturating zone, and each rotor pole having a poleface region, the arcuate extent of which is related to that of the stator poleface regions, so that each poletip portion of a rotor pole which is in alignment with a stator pole is disposed in the vicinity of both a poletip portion of said aligned stator pole and the circumferentially-spaced poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity.

The relatively large circumferential extent of the saturating zone extends the working stroke in that flux increases in an excited phase in a substantially uniform manner with rotor angle throughout substantially the entire duration of pole overlap, i.e. almost up to the full stator pole pitch. In the absence of such a zone, the working stroke would be shorter. The fringing flux path established in the aligned condition of rotor and stator poles when both phases are excited results in a starting torque being developed in this disposition of the rotor, where neither phase acting alone is capable of moving the rotor relative to the stator. In these conditions, the flux fringing between the stator pole tips and the rotor pole tips is highly asymmetrical, thus providing the desired starting torque. The presence of the saturating zone is again necessary for this effect to be achieved, in that under these conditions, i.e. alignment of rotor and stator poles and energization of both phases, the rotor pole surface will assume a magnetic potential approaching that of the pole with which it is aligned, so that adjacent stator poles, if of opposite polarities, cause high fringing flux to the rotor pole, whereas if they are of similar polarities, they cause relatively low fringing flux to the rotor pole. Hence the asymmetry in this flux, referred to above. The establishment of the desired asymmetrical fringing flux pattern under conditions of pole alignment and simultaneous excitation of both phases is favored by the poletips of neighboring stator poles being located in relatively close circumferential juxtaposition. In a favored configuration, the stator poles may carry shoes together defining not less than 80% of the available stator bore periphery.

Said saturating zone may be defined by a region of the rotor pole of reduced ferromagnetic density. In a preferred embodiment, said region of the rotor pole of reduced ferromagnetic density is formed by a part-apertured portion of a rotor lamination, a series of which may be assembled in a rotor stack. The resulting depletion means that the cross-sectional area of iron presented to the magnetic flux in this region is less than it is at any other portion of the flux path. The purpose of the iron density depletion in this region is to provide the saturating zone across which the greater part of the magnetomotive force (mmf) of the stator winding is developed. In further pursuance of this objective, the airgap between the rotor and the stator is made as small as is practicable.

At least a portion of each said rotor poleface region may be of high magnetic permeability. In a favoured configuration, each said portion of high magnetic permeability is a substantially continuous poleface surface layer of the respective rotor poleface region. Said portion or layer may define a pole shoe portion of the rotor pole. Each said rotor poleface region may have an arcuate extent in excess of the stator pole pitch. In a favored embodiment, each rotor pole may also have a waist portion and said poletip portions may extend circumferentially beyond said waist portion to underlie the spaced-apart pole tips or edges of adjacent stator poles in an aligned configuration of the rotor and stator poles.

In a favoured electrical configuration of the motor of the invention, all the magnetizing windings of said first phase may be connected in parallel and all the magnetizing windings of said second phase may also be connected in parallel, so as to force equal rates of change of flux in each pole of the same phase and thereby substantially balance the radial forces acting on the rotor.

In another aspect, the invention also provides a drive system incorporating a motor in accordance with the principles of the invention. A said drive system may comprise control means for energizing said magnetizing windings during motor operation and for initiating a selected one of a plurality of starting sequences in dependence on rotor standstill position at start-up and the desired direction of rotor rotation. Said control means may be adapted to infer rotor position from the values of the phase currents and voltages present on energization of the motor to initiate a said selected one of said starting sequences. The system may alternatively comprise sensor means for producing a signal indicative of rotor position, said control means then being responsive to said rotor position signal to initiate a said selected one of said starting sequences.

The windings are energised by uni-directional currents, and the duration of the period of energization of each winding and the magnitude of its current may be regulated by said control means, which may also, as noted above, be associated with a shaft position sensor. For normal motor operation in a particular rotation sense, currents are sequentially applied to the windings when the overlap of a particular rotor pole with a corresponding stator pole is increasing.

For starting the motor, one of three special routines may be implemented by the control means of the system, in dependence upon the initial shaft position in relative to the desired direction of rotation. These routines may be embodied in either software or hardware. In the first of these routines, a "normal" start is implemented, with immediate energization of the windings by sequential currents. In the second starting routine, a reverse start is first of all implemented, so that the rotor initially executes a small backwards movement, for example, approximately one eighth of a revolution, in search of a favorable position for forward torque. The third starting routine applies in a situation where the rotor is already lined up with one set of poles, so that neither phase acting alone is capable of yielding torque. In this case, both phases are simultaneously excited, to produce, over a small displacement, a torque which may approach the rated torque of the machine. There is thus provided according to the invention, a two-phase reluctance motor, having the ability to start from any rotor position and to run in either direction from its starting disposition.

BRIEF DESCRIPTION OF THE DRAWINGS

The invention will now be described having regard to the accompanying drawings, in which:

FIG. 20 is a chart showing the phase energization sequences required to initiate rotor rotation in a particular desired direction, starting in each case from a stationary position in a particular one of the various sectors of operation identified or indicated in FIGS. 18 and 19, FIGS. 21(a) to 21(a) show a variety of rotor starting dispositions relative to the stator poles.

DETAILED DESCRIPTION OF THE DRAWINGS

Figure 1:
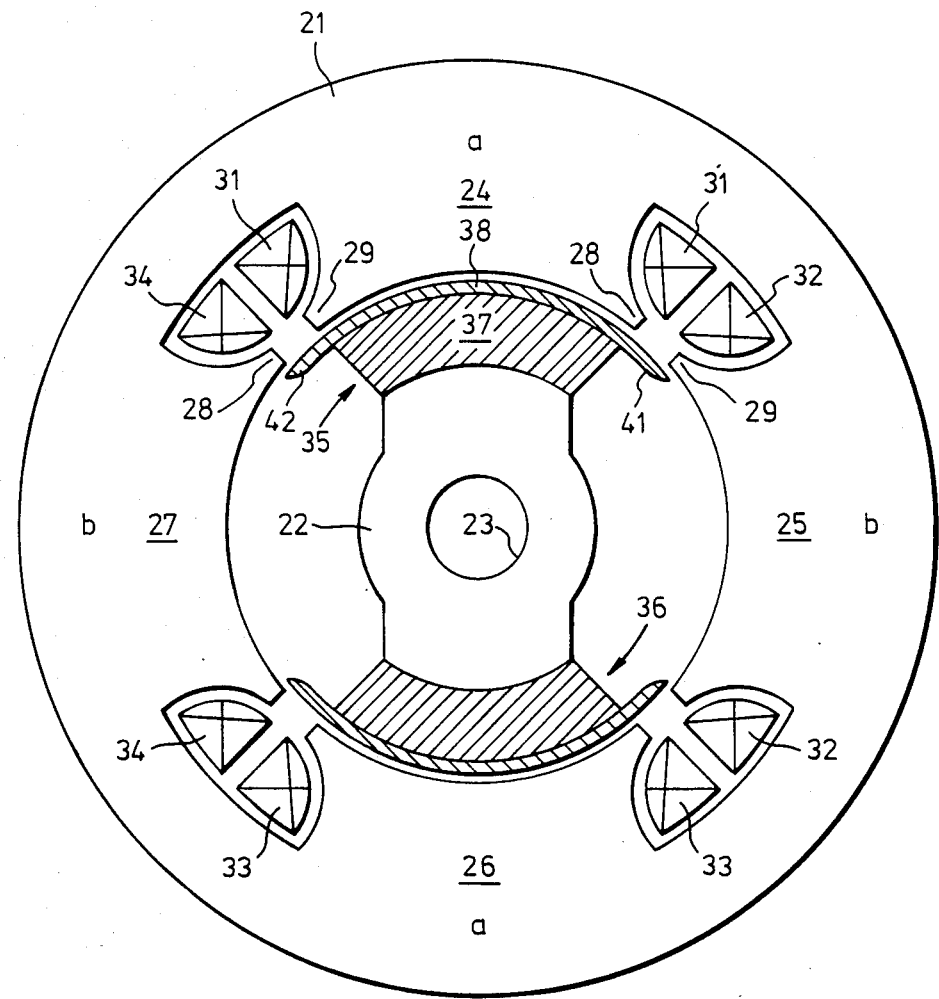
FIG. 1 is an end view of a two phase reluctance machine incorporating the principles of the invention, depicted in a somewhat stylized manner in the stator and rotor poleface regions in particular, in order to illustrate certain features of the invention.
Figure 2:
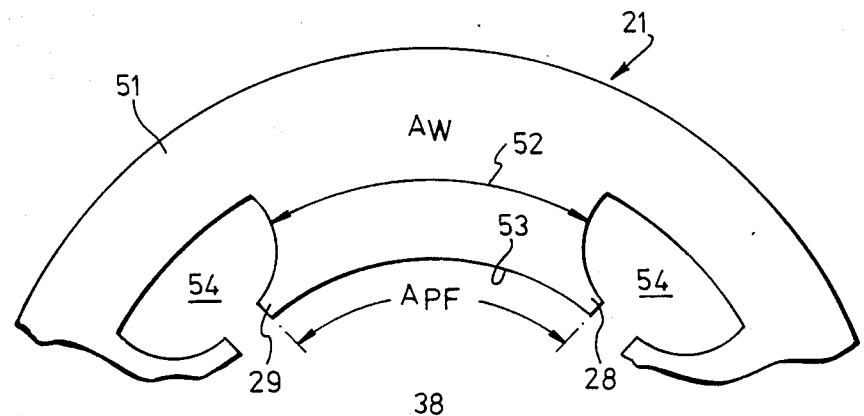
FIG. 2 is a view of a portion of the machine of FIG. 1, showing a single stator pole and a cooperating rotor pole, the rotor pole being spaced apart from the stator pole to illustrate features of the invention.

As shown in FIG. 1, in a four stator pole, two rotor pole two phase machine according to the invention, stator 21 has stator poles 24, 25, 26 and 27. Phase 'a' is defined across poles 24 and 26, while phase 'b' is defined across poles 25 and 27. Windings 31 and 33 are energized for excitation of phase 'a', while windings 32 and 34 serve to excite phase 'b'. Rotor 22 has a central shaft-mounting aperture 23 and rotor poles 35 and 36. In these basic features, the reluctance motor of the invention resembles multi-phase constructions, but the special features by which the present invention is especially distinguished are now described, having regard to FIG. 2 in addition to FIG. 1. In FIG. 2, the stator region in the vicinity of pole 24 is depicted, along with pole 35 of the rotor, this latter being displaced away from the stator in this Figure in the interests of clarity.

As shown in FIGS. 1 and 2, each stator pole is of greater circumferential or arcuate extent in the region of its poleface 53 than it is in the vicinity of its waist region 52, where the pole extends radially inwardly from the yoke 51 of the stator towards its poleface region 53. The stator poles thus have shoes of extended arc, so as to give an extended working stroke. The stator pole has, accordingly, respective poletip regions, designated by references 28 and 29, at each of its arcuately or peripherally spaced sides. These pole tips extend close to the corresponding pole tips of the adjacent poles, as may be seen in FIG. 1, where pole tip 28 of pole 24 is spaced at only a relatively short distance from pole tip 29 of pole 25, while tip 29 of pole 24 is similarly spaced from tip 28 of pole 27. In order to achieve the desired extended working stroke, these poletips are at the closest possible spacing also consistent with the minimization of leakage flux between adjacent stator poles, and each stator poleface has, therefore, as long an arcuate extent as possible. In an idealized situation, each stator pole would have a circumferential extent corresponding to an arc of 90° in a four pole construction, with minimal gaps. The avoidance of excessive flux leakage prevents, however, such an idealized construction from being fully achieved in practice. While close spacing of pole tips would normally be seen as disadvantageous, in that it tends to facilitate the direct passage of fringing flux from one stator pole to another and thus reduces the efficiency of a machine, in the present invention, this configuration of stator pole is also utilized to bring about self-starting of the two-phase machine, in a manner to be described subsequently. The criteria governing the extent of the tip spacing, so that self-starting is achieved without excessive loss of fringing flux, are also further explained.

In general, in multi-phase constructions of reluctance machines, the poleface area of the stator pole is substantially equal to the cross-sectional area of the pole in its waist region. In the present construction, such a relationship between the poleface area and the waist cross-section is not practicable, in that the pole must have a lesser arcuate dimension in its waist region, in order to enable sufficient winding or copper space 54 to be provided to accommodate coils of the size necessary to establish the requisite field levels in operation of the motor. Thus as depicted in FIG. 2, the poleface area $A_{PF}$ of pole 24 is substantially greater than the cross-sectional area $A_W$ of the pole in its waist portion. The maximum level of flux which can be sustained or supported in the magnetic circuit is, however, effectively limited by the waist cross-sectional area $A_W$ of the stator pole, and thus despite the provision of the extended pole shoe, the working stroke would still be limited to an arcuate extent approximately equal to that of the stator pole waist, in the absence of the further features of the rotor, now described.

As already explained in a previous paragraph and as amplified in the references cited, a linear growth in magnetic flux in a flux path passing through both stator and rotor poles is required in a reluctance motor, this growth in flux being in substantial dependence upon pole overlap only and being substantially independent of the level of the exciting current. In the present configuration of motor, the maximum flux density in the stator pole will be determined by the waist cross-section $A_W$, and accordingly the rotor pole construction shown in FIGS. 1 and 2 is adopted, in order to ensure that a constriction zone will be located at or close to the airgap. In the arrangement depicted in these Figures, the iron density is restricted in a depletion layer 37 in the vicinity of the surface of the pole and a relatively thin highly-permeable surface layer 38 is defined radially outward of the depletion layer. As depicted in FIGS. 1 and 2, this highly-permeable surface layer 38 also extends circumferentially or angularly outwardly of the rotor pole to define rotor poletips 41 and 42 extending axially along each arcuately spaced edge of the rotor pole. The relative dimensions of the layers 37 and 38 and the density of the ferromagnetic material in the depletion layer 37 are selected to ensure that saturation conditions prevail in the constriction zone in the region of the rotor poleface substantially throughout pole overlap, i.e. considering clockwise rotation, from the initial overalp of rotor pole tip 41 with stator poletip 29 until the substantially fully overlapped condition depicted in FIG. 1 is attained. Thus a working stroke approaching 90° is achieved.

In the prior arrangement of U.S. Pat. No. 3,956,678 of Byrne et al, the saturated constriction zone was placed at or near the surface of the rotor, so that the saturated or constriction cross-section increased over the large displacement angle, equal to the arcuate extent of the rotor pole surface, which was required in that configuration to bring the rotor into a starting position with respect to the following phase. In the present invention also, the restriction or constriction is similarly located and is arranged so that the depletion layer 38 saturates before the rotor body or the stator pole waist. Unlike the prior motor, however, the depleted region in the machine of the present invention is not limited to a particular edge region of the rotor pole and extends over the full circumferential extent of the pole. Thus the motor of the invention is reversible and may be operated in either direction, and in addition, the motor is self-starting from any disposition of the rotor. In particular, the motor may be self-started when the rotor poles are in alignment with a pair of stator poles, by simultaneous excitation of both phase windings, so that fringing flux passes between the extended pole tips of the stator poles via the highly-permeable surface layer 38 of the rotor, thereby exerting a torque on the rotor by virtued of a phenomenon now to be described having regard to FIGS. 1 and 2, together with FIGS. 3 and 4.

Figure 3:
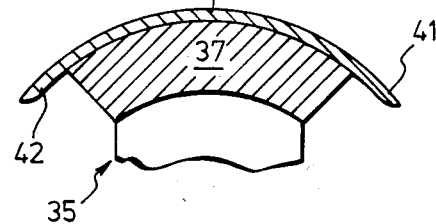
FIG. 3 is a developed section of a machine substantially similar to that of FIGS. 1 and 2.
Figure 3:
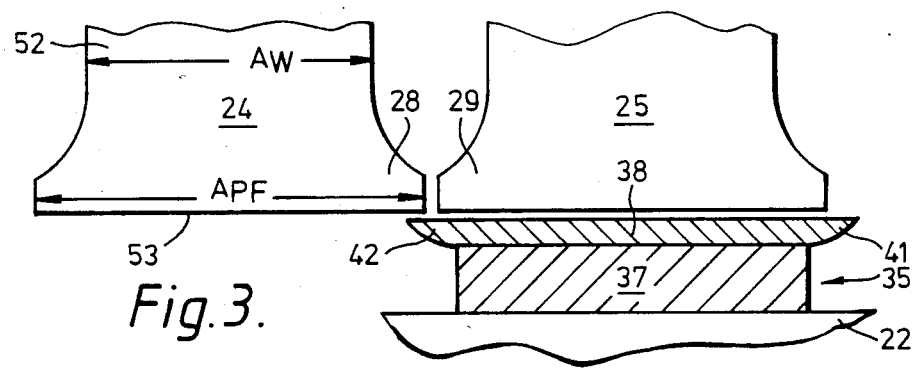
Figure 4:
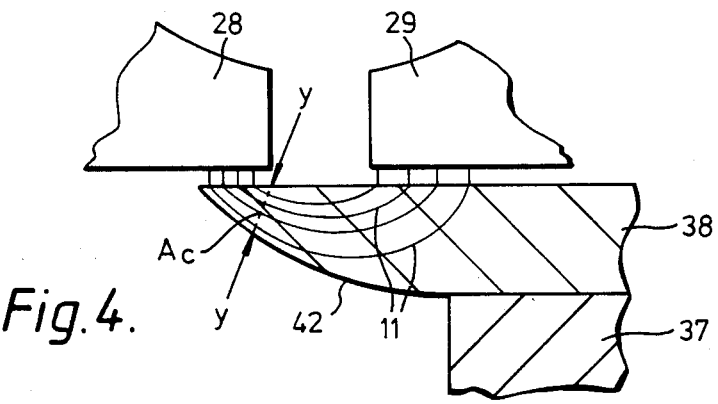
FIG. 4 is an enlarged detailed view of an overlapping pole tip region of the rotor and stator of the arrangement of FIG. 3.

FIG. 3 shows the stator poles 24 and 25 of FIGS. 1 and 2 in a developed view, together with rotor pole 35 in this instance in alignment with stator pole 25. All of the features indicated on FIG. 3 have already been described having regard to FIGS. 1 and 2, but the stator pole tips 28 and 29 are shown somewhat closer together than in the earlier Figures, to assist in the following explanation of starting from a rotor disposition with the rotor poles aligned with a pair of stator poles. FIG. 4 is an enlarged view of the overlapping pole tip region, where rotor pole tip 42 at the extremity of the thin high-permeability shoe or poleface portion 38 underlies the adjacent pole tips 28 and 29 of the stator poles.

In this aligned disposition of the poles, the rotor pole tip 42 bridges the space between the adjacent stator pole tips and provides a flux path between them, through which flux may flow when driven by simultaneous excitation of both sets of phase windings, thereby giving torque at the torque dead point where neither phase acting alone is capable of turning the rotor.

Magnetic flux lines are indicated in FIG. 4 by reference 11. The area of magnetic constriction $A_c$ in the relative disposition of the rotor and stator poles as depicted in FIG. 4 is indicated by the space between the arrows on line y—y. The torque generated by the motor is proportional to the magnetomotive force (mmf) established by energization of the phase windings, multiplied by the incremental rate of increase of the area of the magnetic constriction. The relationship may be expressed by the formula $$\text{Toque} = mmF \times (dA_c/d\theta)$$

$\theta$ being representative of rotor rotation in angular terms.

As already noted, torque is developed only in the presence of an increasing constriction area. Appropriate profiling of the pole tip region brings about a smooth build-up of flux so that torque is produced and rotor pole 35 is displaced to the left. The torque effect of the combined energization of the two phases is effective only over a relatively short displacement of the rotor with respect to the stator and must be succeeded by conventional sequential energization of the phases in order to bring about continued rotation of the rotor.

Figure 5:
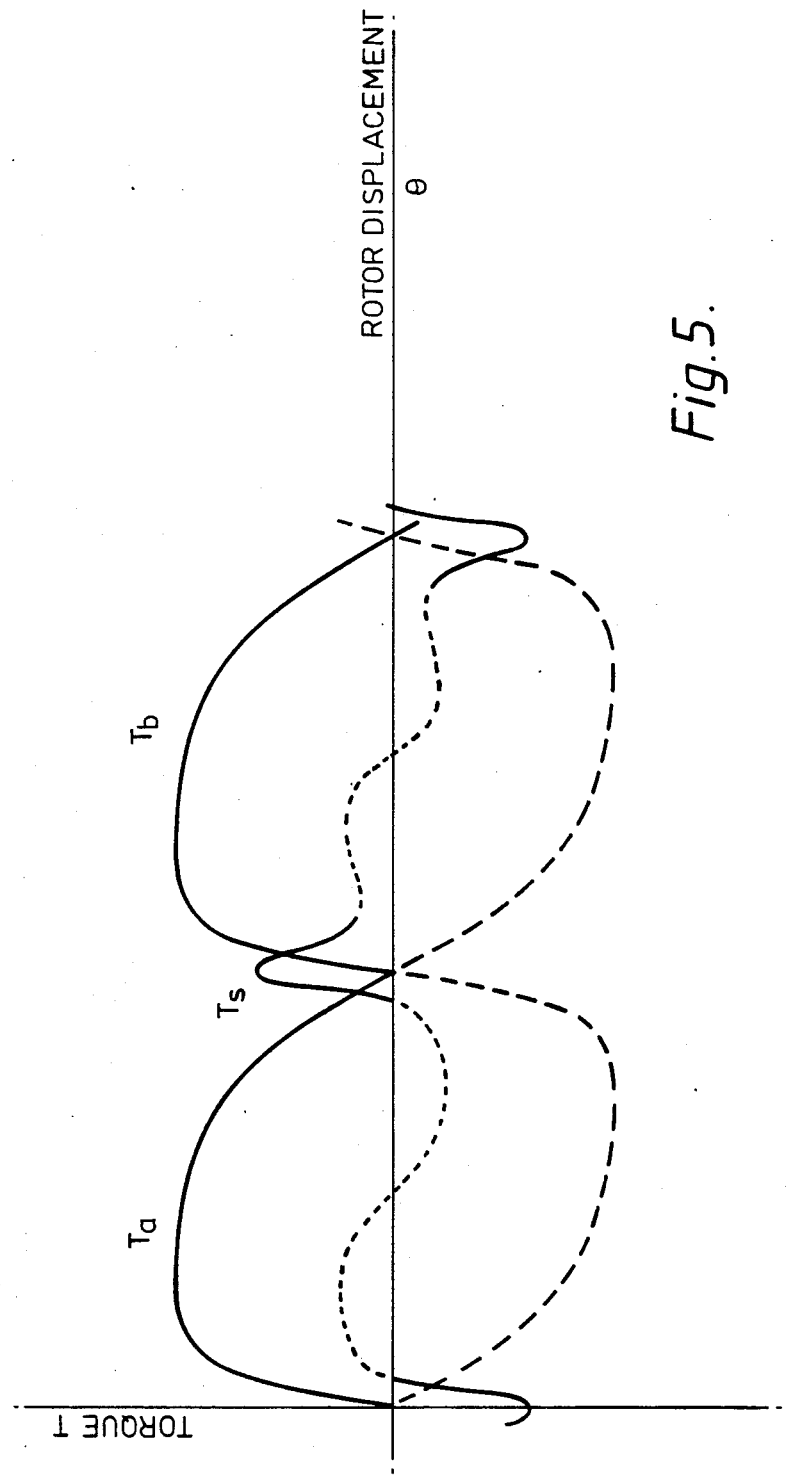
FIG. 5 is a diagram showing phase torques against rotor angle for a two-phase machine such as the constructions of FIGS. 1 to 4, and also illustrating the poletip torque developed by the simultaneous excitation of both phases, which is a feature of the present invention and facilitates self-starting of a machine in accordance with the invention.

FIG. 5 is a diagram showing the individual phase torques $T_a$ and $T_b$ of the motor of FIGS. 1 to 4. The positive portions of the phase torque curves are shown in solid line in FIG. 5, while the negative portions of the torque curves, indicated in dotted line in the drawing, are suppressed during forward operation by the appropriate phase's not being excited during the respective increment of machine rotation. The phase torque portions $T_a$ and $T_b$ shown in solid outline correspond to clockwise rotor rotation in FIG. 1, or displacement to the right in FIG. 3, $T_a$ being developed as rotor pole 35 moves into alignment with stator pole 24, the zero torque point between $T_a$ and $T_b$ corresponding to full alignment of the rotor with the phase 'a' poles, and $T_b$ then being developed as the rotor moves on to overlap the phase 'b' poles. A further torque dead point occurs when the rotor is in full alignment with phase 'b'. The starting torque established by simultaneous excitation of both phases with the rotor in alignment with a pair of stator poles is indicated by the $T_s$ torque curve, shown in solid line in FIG. 5 as extending over a relatively short increment of rotor rotation in the vicinity of the torque dead point. It will be seen that this torque bridges the torque dead point, when neither phase acting alone is capable of establishing torque. The continuation of this torque curve, established by excitation of both phases, 'a' and 'b', away from the region of the torque dead point, is indicated in dotted line in FIG. 5, and substantially corresponds to the algebraic sum of the torques $T_a$ and $T_b$, e.g. over the first sector of rotor rotation depicted in FIG. 5, the sum of the positive portion of $T_a$ and the negative portion of $T_b$. It will be seen therefore, that the torque developed by excitation of both phases at the same time is of significant magnitude over only a short sector of rotor rotation and that its level is relatively low once the rotor is at any distance away from the torque dead point of either phase acting alone.

Figure 6:
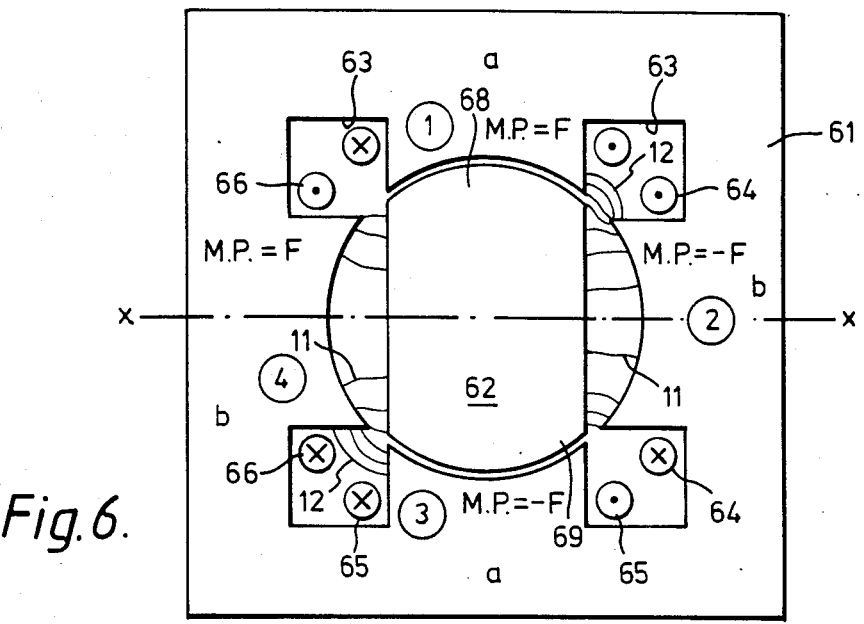
FIG. 6 is an end view of an ideal magnetically linear two-phase reluctance machine, with both phases excited.

The principles on which the starting torque phenomenon described above are based may be further illustrated by reference to FIGS. 6 and 7. As shown in FIG. 6, an idealised two-phase magnetically linear reluctance machine has a stator 61 and a rotor 62, and is constructed of infinitely-permeable iron. The stator has four poles, identified by references 1, 2, 3 and 4, and the rotor thus has two poles, identified by references 68 and 69. Phase 'a' is defined across poles 1 and 3 of the stator and is energized by stator pole windings 63 and 65. Phase 'b' is similarly defined across poles 2 and 4 and is energized by stator pole windings 64 and 66. An axis of symmetry of the machine is indicated by the line x—x. The tips of the stator poles are depicted in essentially stylized manner, but are intended to be substantially contiguous, so that fringing flux passes directly between them, as indicated by reference 12.

It will be immediately apparent that such an idealized machine will not start from the position shown, in which the rotor poles 68 and 69 are aligned with poles 1 and 3 of phase 'a', when either phase 'a' or phase 'b' is excited individually. Neither will any significant torque be generated when both phases are excited simultaneously. This latter condition is illustrated in FIG. 6. Excitation of phase 'a' results in stator pole 1 having a magnetic potential (MP) of $+F$, while pole 3 of phase 'a' has a magnetic potential of $-F$, the letters 'F' being denoted on the drawing in italic script. In phase 'b', pole 4 is at a magnetic potential of $+F$, while pole 2 has a potential of $-F$. However by symmetry, the entire rotor will have zero magnetic potential, so that the magnetic potential difference between the stator pole and the rotor surface will be either $+F$ or $-F$ at all points, while the fringing flux density distribution from pole 2 to the rotor, and also that from pole 4 to the rotor, will be substantially symmetrical about the axis x—x.

Thus there are equal pulls exerted on each side of this idealized magnetically linear rotor, the symmetry of the construction meaning that counter-clockwise forces tending to rotate the upper pole of the rotor to the right, i.e. in the clockwise direction as it is depicted in FIG. 6, are cancelled out by similar forces tending to rotate it in the counter-clockwise direction. Thus the fringing flux 11 depicted as traversing the space between the rotor and the stator poles 2 and 4 yields negligible torque in this arrangement.

Figure 7:
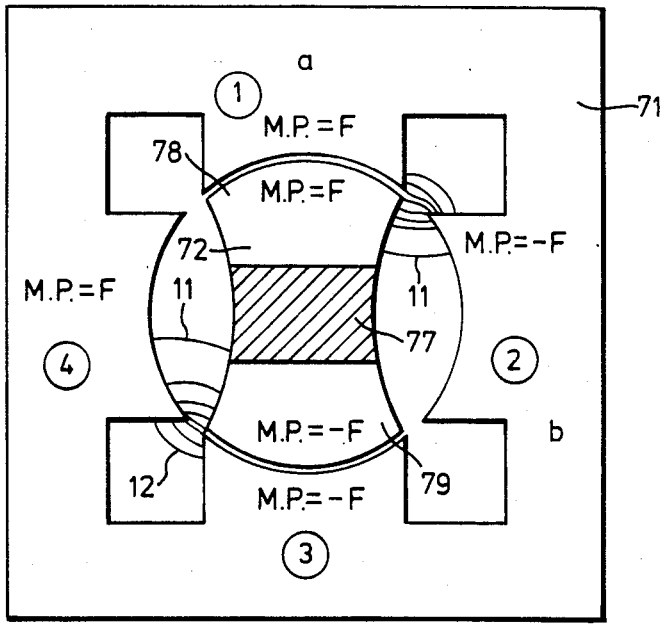
FIG. 7 is a similar view of a two-phase reluctance machine having a rotor flux constriction, again with both phases excited, these two FIGS., 6 and 7, being together explanatory of certain principles underlying the present invention.

In FIG. 7, an idealized machine illustrative of the basic principle or concept of the present invention is depicted, having a stator 71 and a rotor 72. Rotor 72 is, in this instance, not infinitely permeable, and also incorporates a stylized flux constriction 77, where magnetic saturation will occur in operation of the machine. This zone of magnetic constriction takes the form of a "waisting" of the rotor in the region of its axis of rotation, so that its cross-section, as seen by the magnetic flux, is reduced in this portion of the rotor, as compared with its cross-section in the direction of its arcuate extent in the vicinity of its pole faces. Thus a difference in magnetic potential is created across this constriction zone in the disposition of the rotor depicted, when the 'a' phase windings of the machine are excited. This difference in magnetic potential is caused by constriction of the iron cross-section available for flow of magnetic flux in this radially central region of the rotor.

In this construction, when the appropriate phase windings are energized, the unsaturated parts of the rotor assume the magnetic potentials of the stator poles with which they are aligned, provided that the airgap between the stator and rotor poles is small so that reluctance is low in this portion of the flux path. Such a condition is illustrated in FIG. 7, in which energization of phase 'a' results in poles 1 and 3 having the respective magnetic potentials $+F$ and $-F$. Rotor pole 78, which is aligned with stator pole 1, then also has a magnetic potential of $+F$, while rotor pole 79, which is aligned with stator pole 3, has a magnetic potential of $-F$. The total magnetomotive force, 2F, of phase 'a' is thus "dropped" across the saturated constriction zone 77. If phase 'b' is now also energized in addition to phase 'a', then pole 2 will have a magnetic potential of $-F$ and pole 4 a magnetic potential of $+F$. Thus there is now a substantial assymmetry in the fringing flux between the rotor 72 and poles 2 and 4 of phase 'b', as indicated by the flux lines 11 extending between poles 78 and 2 and poles 79 and 4 in FIG. 7, so that a strong clockwise torque acts on the rotor. Accordingly clockwise rotation will take place. After a small clockwise displacement, phase 'a' current may be cut off, energization of phase 'b' being maintained, and the machine may then be accelerated using sequential currents and successive energization of each phase in turn in conventional manner.

This special starting characteristic achieved in the idealized construction of FIG. 7 is, however, obtained at the expense of a curtailed "working stroke", this being defined as the relative displacement of the rotor with respect to the stator over which useful torque is produced. After a partial overlap of the poles, for example poles 78 and 79 with poles 2 and 4 in the arrangement of FIG. 7, the constriction zone 77 at the center of the rotor becomes saturated, and torque then falls off rapidly with further overlap. As already explained, in order to achieve an extended working stroke for each phase, flux should continue to build up in a substantially linear manner for the greatest possible angular increment of pole overlap.

This is achieved by the arrangements already described in regard to FIGS. 1 to 4, in which iron density is restricted in the vicinity of the rotor pole surface to form a saturating layer in this region.

Figure 8:
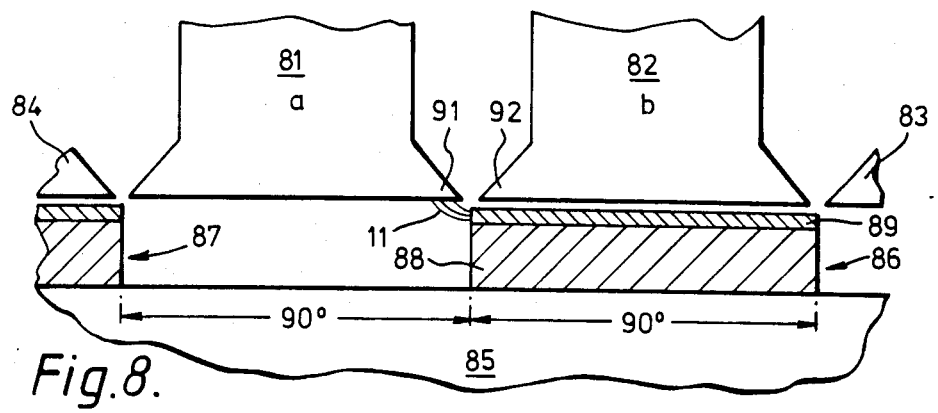
FIG. 8 is a developed section of a further configuration of machine according to the invention, again illustrating principles of the invention.

A developed section of a further machine incorporating the principles of the present invention is shown in FIG. 8. This machine has stator poles 81, 82, 83 and 84. The stator poles have shoes of extended arc, so as to give an extended working stroke. Thus the stator pole tips, as indicated for poles 81 and 82 by references 91 and 92, are, for this purpose, at the closest possible spacing also consistent with the minimization of leakage flux between adjacent stator poles. Thus each stator pole face has as long an arcuate extent as possible. In an idealized situation, each stator pole would have an extent corresponding to an arc of 90° in a four pole construction, with minimal gaps. The avoidance of excessive flux leakage, however, prevents such an idealized construction's being fully achieved in practice.

Rotor 85 of this machine has rotor poles 87 and 88, each of which is formed with a thin, high-permeability shoe or poleface portion 89 on the poleface facing the stator poles. Backing this face portion 89 is a further region or layer 88, formed of material which is more easily saturated than the material of the rest of the machine. This saturation may be achieved by layer 86 being an iron depletion layer, as subsequently described.

In effect, in this construction, as also in that of FIGS. 1 to 4, the saturable zone 27, shown in the middle of the rotor in the vicinity of its axis of rotation in FIG. 7, is replaced by two separate zones of magnetic constriction, each located near a rotor pole surface. Thus the restriction on the magnetic flux is moved up to a location immediately beneath the rotor poleface, i.e. radially inward of the poleface. An increase in the working stroke of the machine during its normal operation is achieved by this radial displacement of the magnetic constriction zone to the outer periphery of the rotor pole.

The arrangement of FIG. 8 differs from that of FIGS. 1 to 4, in that the high-permeability surface layer 89 does not in this instance extend circumferentially outward of the tips or edges of the pole, so that the pole does not have the peripherally extending tip portions of the previous configuration. The pole tip torque effect described and illustrated in the diagrammatic representation of FIG. 5 has been found, however, to be nonetheless established with the present construction of pole in similar manner to the arrangement of FIGS. 1 to 4. Thus the torque produced by the fringing flux between the contiguous stator pole tips passing through the edge or poletip region of the rotor pole is in no way dependent on this edge region constituting a circumferentially projecting poletip portion. Provided that the poletip portion or edge of the rotor pole is sufficiently close to the pole tip region of a stator pole neighboring that with which the rotor pole is in alignment in a dead torque disposition of the rotor, then the necessary flux flow will occur on excitation of the two phases of the machine, to bring about the initial rotor displacement required to move the rotor out of the zero-torque position for normal excitation. The flux lines are again indicated in FIG. 8 by reference 11.

Figure 9:
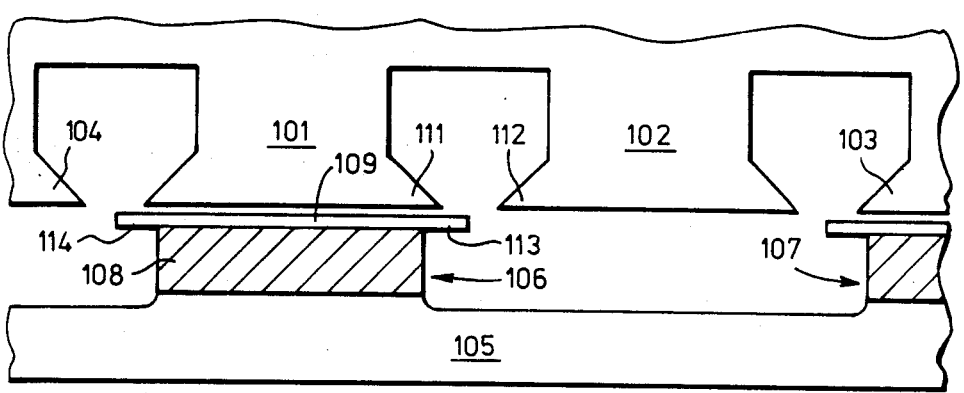
FIG. 9 is an alternative arrangement of machine incorporating the principles of the invention, represented in similar developed manner to the machine of FIGS. 3 and 4, and that of FIG. 8, FIGS. 10(a) to 10(f) show a variety of still further arrangements of machines incorporating the principles of the invention, in developed sectional views similar to that of FIGS. 3 and 4, and those of FIGS. 8 and 9.

FIG. 9 represents a further variant on the arrangements thus far described. The machine in this instance has stator poles 101, 102, 103 and 104, while rotor 105 has poles 106 and 107. The stator poles again have shoes of extended arc, to give an extended working stroke, adjacent stator pole tips 111 and 112 being disposed at a relatively close circumferential or linear spacing. Each rotor pole has a thin, high-permeability shoe 109, which in this instance again projects in the circumferential direction beyond the main body of the rotor pole and is of an arcuate extent such that when the rotor pole 106, for example, is aligned with stator pole 101, as shown in FIG. 9, the rotor pole tips 113 and 114 reach almost to the tips of the stator poles 102 and 104, adjacent to stator pole 101. Immediately beneath this poleface layer 109, in a radially inward direction, each pole has a layer 108 of material which is more easily saturated than the material of the remainder of the machine. Such material may have a saturation flux density of the order of B=1.0.

The surface layer indicated in FIG. 9 by reference 109 is preferably very thin in an idealized construction. This configuration of the surface layer prevents excessive transmission of flux along the arcuate extent of the pole, so that, in an idealised construction, torque generation continues throughout the working stroke. A long working stroke is fostered by flux build-up continuing in a linear manner for the greatest possible angular increment of rotation. In a practical machine, however, the terminal 10%, approximately, of rotor pole overlap with a stator pole may not be especially efficient so far as torque generation is concerned, since at this stage the rate of flux change with displacement is inevitably decreasing.

Figure 10A:
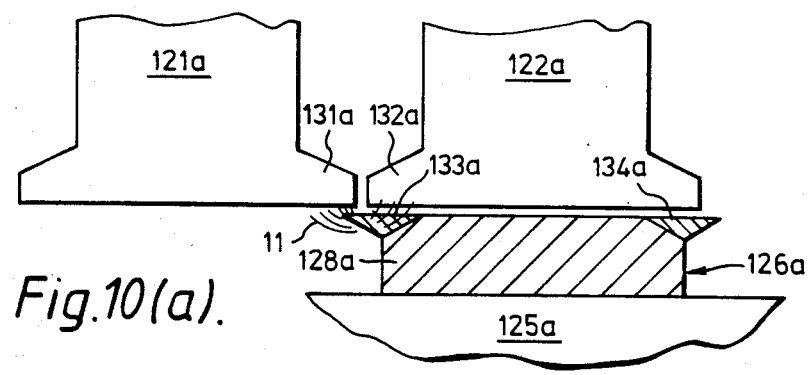

Further constructions of rotor pole may also be provided, and a number of additional variants are illustrated in FIGS. 10(a) to (f). The depletion zone may, for example, extend to the pole surface, between the pole tips. Such an arrangement is shown in FIG. 10(a), in which stator poles are indicated by references 121a and 122a, the rotor by reference 125a and a rotor pole by 126a. The depletion zone 128a extends to the poleface surface between the edge regions or tips 133a and 134a of the pole, which in this instance together define the high permeability region of the pole. Flux lines passing through pole tip 133a from and to stator pole tips 131a and 132a are indicated by reference 11.

Figure 10B:
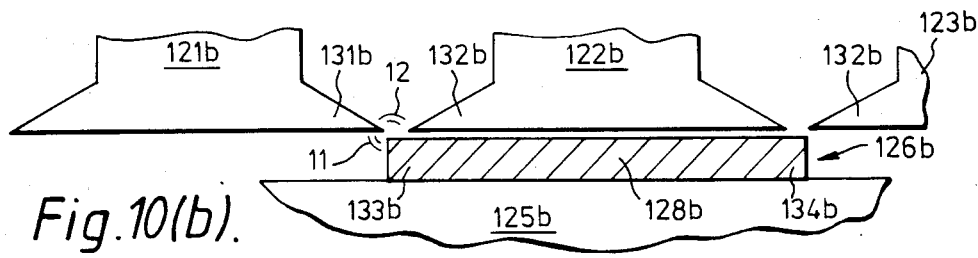

FIGS. 10(b) to 10(f) illustrate still further variations in the relative configurations of stator and rotor poles in motors embodying the principles of the invention. In each case, similar features to the features of FIG. 10(a) already discussed are indicated by similar reference numerals with the addition of an appropriate suffix letter. In FIG. 10(b), homogeneous poles are used, for example of an iron alloy, to give an iron density of approximately 50% of that of pure iron, so that the saturation flux density will be of the order of one tesla or less. The circumferential extent of the rotor pole is such that when it is aligned with stator pole 122b, its lateral extremities or poletip portions 133b and 134b are substantially in line with the pole tips 131b and 132b of poles 121b and 123b. This construction thus lacks the high-permeability surface layer of the earlier constructions, but it has been found to function in a substantially identical manner to the configurations having such a layer.

Figure 10C:
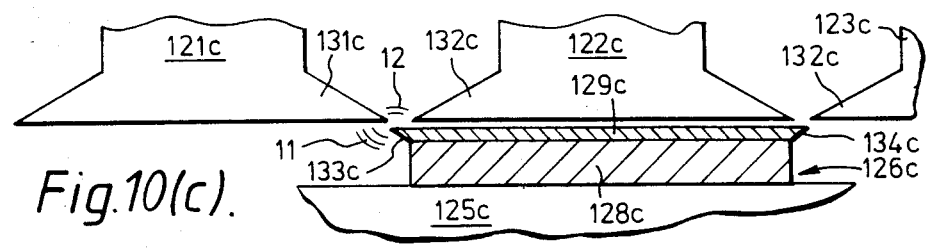
Figure 10D:
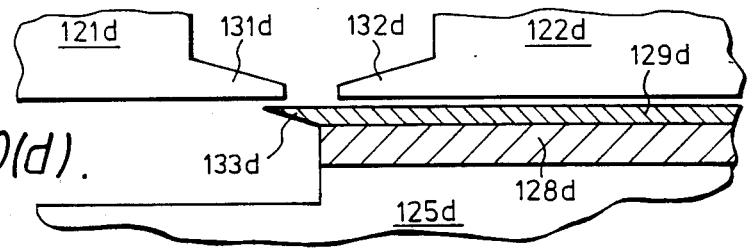

FIG. 10(c) shows a further configuration having a surface layer 129c of high permeability, backed by the saturable layer 128c. The rotor pole tips 133c and 134c are tapered and their extremities align with the extremities of the stator pole tips 131c and 132c of poles 121c and 123c in the aligned disposition of rotor pole 126c and stator pole 122c. FIG. 10(d) shows a further similar configuration of machine, in which the extent of the saturable layer 129d is such that the rotor pole tip 133d actually in part underlies the stator pole tip 131d in the aligned configuration of the rotor pole and stator pole 122d. This arrangement thus resembles that originally described in regard to FIGS. 1 to 4. As shown in FIG. 10(d), the depth of the saturable layer 128d is less than the full radial height of the rotor pole, unlike the constructions previously described, in which the saturable layer, together with the surface layer where present, occupied substantially the full height of the pole.

Figure 10E:
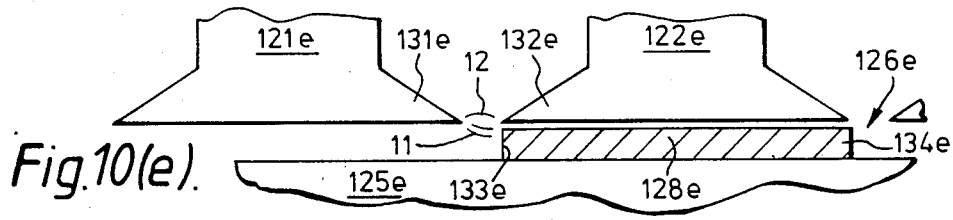
Figure 10F:
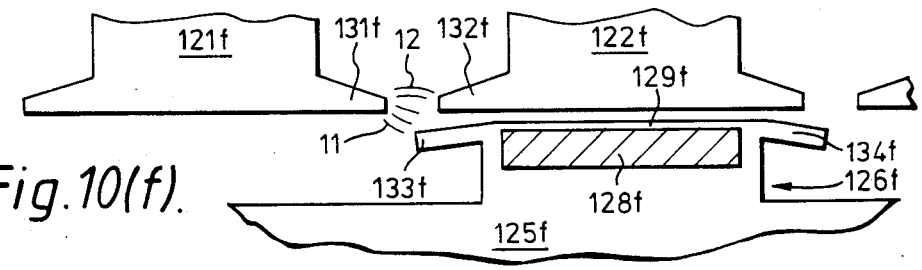

FIGS. 10(e) and 10(f) show further variations of machine according to the invention, having somewhat less favorable starting characteristics, but more favorable running performance at high speeds. In each of these constructions, the circumferential extent of the rotor pole is such that in the pole-aligned disposition, the rotor pole tips do not reach fully to the tips of the adjacent stator poles but their extent nonetheless remains sufficient for flux to pass through them when required for start-up. However, unlike the constructions described in relation to FIGS. 10(a) to 10(d), in which the flux is entirely in iron, in these configurations the flux is partly in air. For the case where the fringing flux takes a route almost entirely in iron which saturates at the constriction, e.g. reverting to FIG. 4, an area $A_C$, the force associated with the fringing flux is of the form $$F_x = 1.0 (mmF) d\phi/dx$$

where
$F_x$ is an x-directed, i.e. tangential, force, and
$\phi$ is the magnetic fringing flux.

By contrast, where the flux passes at least in part through air, the relationship takes the form $$F_x = \tfrac{1}{2}(mmF)d\phi/dx$$

Thus the former equation represents the more favorable relationship, so far as the magnitude of the force is concerned.

The rotor hole 125e of FIG. 10(e) consists entirely of material of depleted iron density, as in the case of the arrangement of FIG. 10(b), while in the configuration shown in FIG. 10(f), the depletion zone is again of lesser depth than the height of the pole, i.e. it is somewhat similar to the arrangement of FIG. 10(d).

Figure 11:
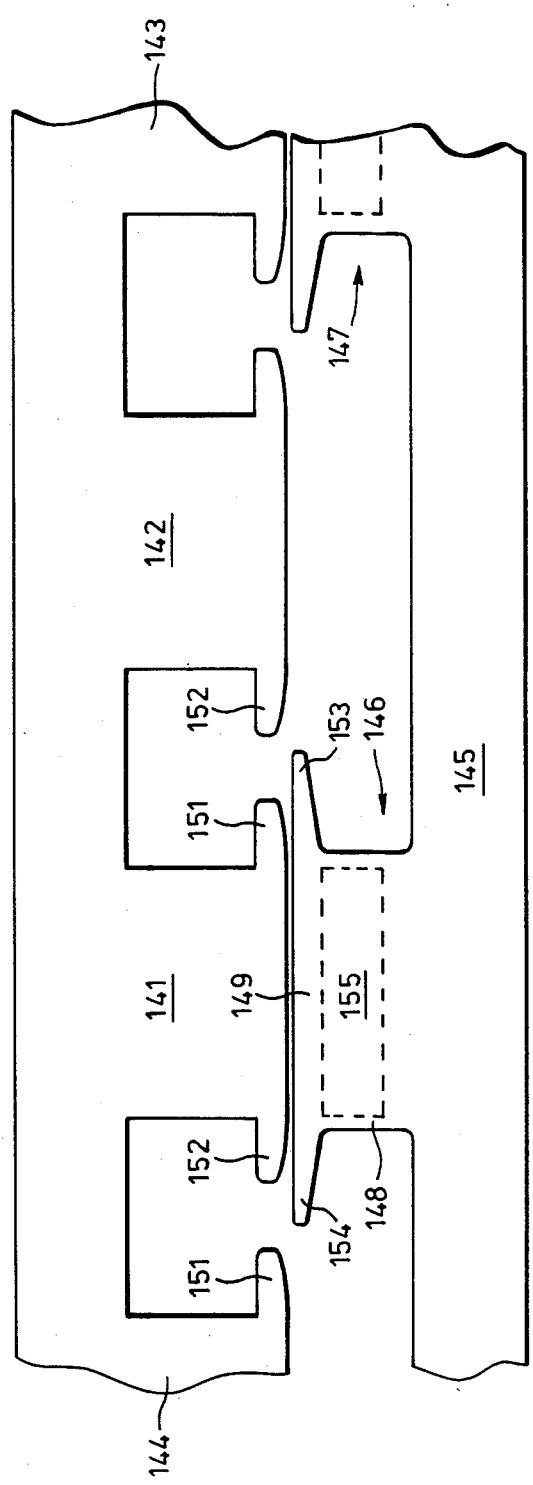
FIG. 11 is a developed representation of a practical realisation of the conceptual arrangement of FIGS. 3 and 4.

FIG. 11 shows a practical construction of motor in accordance with the invention, in which the saturating regions of the rotor poles are realized by punching holes in alternate laminations of the rotor. As shown in the Figure, the motor has stator poles 141, 142, 143 and 144, of a different configuration again to those previously illustrated. The shaped stator pole tips are indicated by references 151 and 152. Rotor 145 has rotor poles 146 and 147, each of which has a depletion layer 148, within which magnetic saturation is established more easily than in the rest of the material of the machine, and the poleface is fronted by a layer or zone 149 of relatively high magnetic permeability. The rotor pole tips are indicated by references 153 and 154, while reference 155 indicates one of the punched holes by which the depletion layer is realized. This disposition of alternate apertured laminations results in the permeability of the layer 148 being slightly more than half of that of a continuous construction of rotor. In such practical realizations, the tapering or configuration of the pole shoe tips and their arcuate extent may be substantially optimised using computerized magnetic field solution techniques, in order to achieve a substantially optimized compromise between adequate starting torque and any undesired fringing flux which would affect the high speed performance of the machine.

Figure 12:
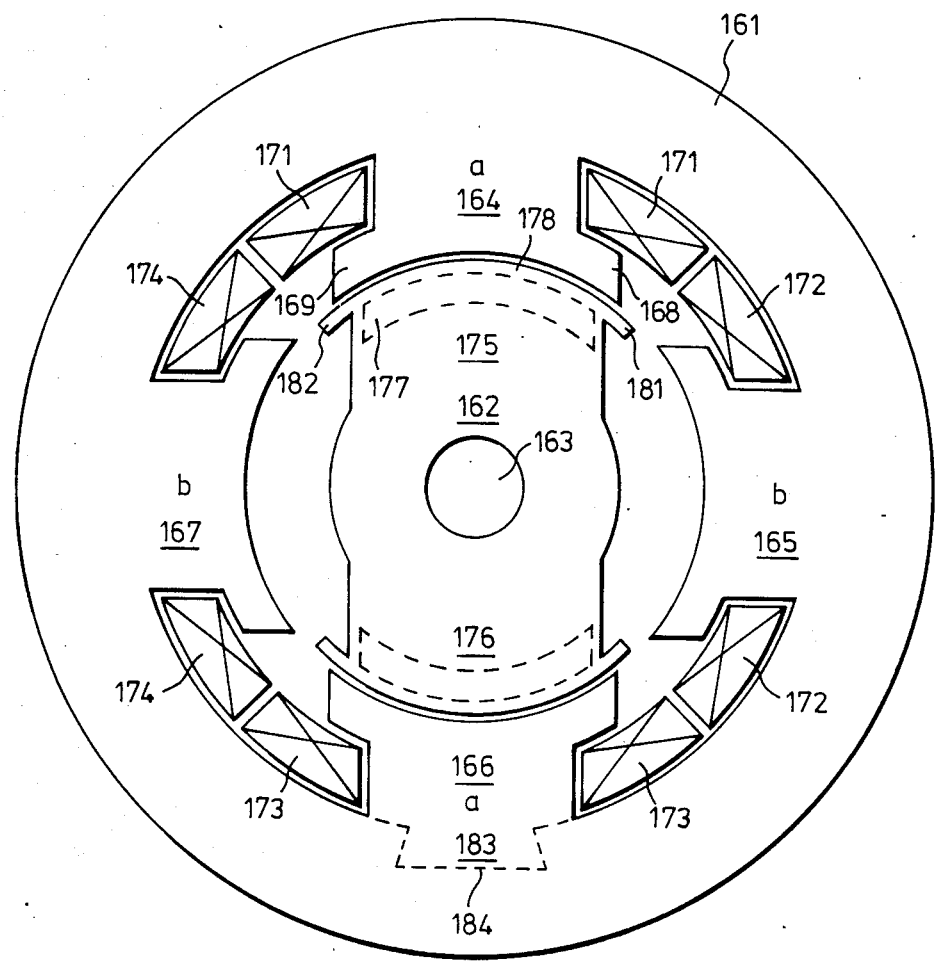
FIG. 12 is an end view of a four pole motor in accordance with the invention, in which the iron density depletion layer of the rotor is defined by holes punched in alternate rotor laminations.

FIG. 12 shows a four stator pole machine according to the invention. Stator 161 has stator poles 164, 165, 166 and 167. Phase 'a' is defined across poles 164 and 166, while phase 'b' is defined across poles 165 and 167. Windings 171 and 173 are energised for excitation of phase 'a' while windings 172 and 174 serve to excite phase 'b'. Rotor 162 is mounted on a shaft by means of shaft aperture 163 and has rotor poles 175 and 176. Each pole 175 or 176 has a depletion layer 177 defined by alternate laminations having punched holes in a region underlying the pole face surface. Thus the outermost surface layer 178 of each pole represents the region of the pole of enhanced magnetic permeability. Rotor pole tips 181 and 182 extend arcuately or circumferentially outwardly of the pole sides, while the stator poles have similarly extended tip portions indicated by references 168 and 169. Each stator pole may be detachably mountable in the yoke portion of the stator 161, in the manner indicated in dotted outline for pole 166. The rear or radially outermost region of the pole has a flanged portion 183, which slidingly engages in a dovetailing manner in a correspondingly profiled axial recess 184 in the stator yoke. The pole is grippingly engaged against radial displacement by the undercut sides of the slideway recess 184.

While the arrangement shown in FIG. 12 meets the requirement for establishment of a depleted constriction zone for magnetizing flux immediately radially inward of the pole face surface, the construction depicted may require two different types of rotor lamination to be provided, every second lamination along the axial extent of the rotor differing from its immediately adjacent neighbors. Alternatively the keyway may be located at 90° to the pole arc and one pole only of each lamination punched. Every second lamination in the rotor stack is then turned over with respect to its neighbors, so that the punched-out hole is to the opposite side of the rotor axis compared again with the immediately adjacent laminations.

Figure 13:
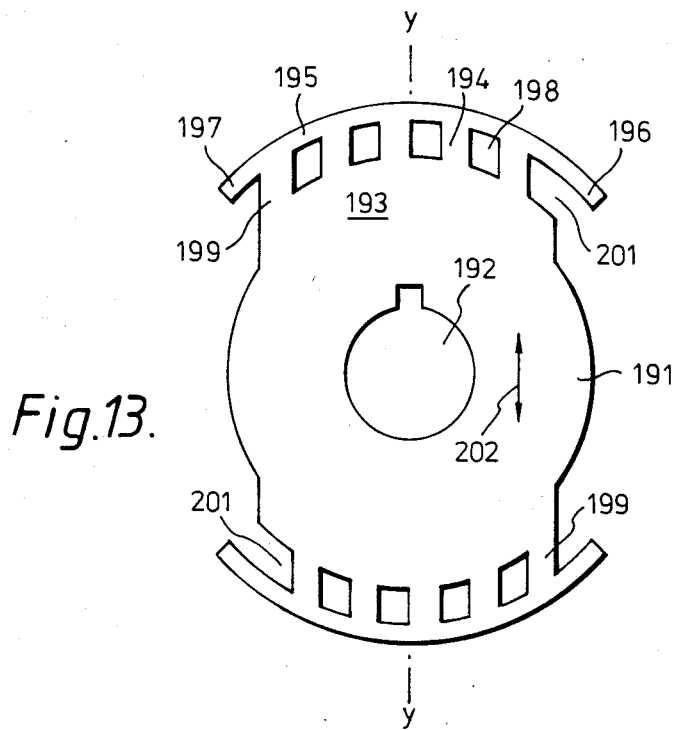
FIG. 13 is a view of a rotor lamination, in which depletion is achieved by offset punching of a series of relatively small holes in the vicinity of the poles.

In a further arrangement, shown in FIG. 13, an asymmetric hole punching scheme is depicted, which allows a single type of rotor lamination to be used. As shown in this Figure lamination 191 has a central aperture 192 for mounting and keying the rotor structure onto the motor shaft. Each rotor pole region 193 of the lamination has a depleted region 194 formed by punching out a series of holes along its circumferential extent. These holes 198 are each identical but they are disposed asymmetrically with respect to the elongate axis y—y of the lamination. Thus to the left hand side of the lamination, as seen in FIG. 13, at its upper pole face, the depleted zone 194 terminates in a solid bridge portion 199 extending between the main body of the lamination and the poleface region 195, while at the other circumferential end of the depleted region 194, the region terminates in a punched-out area or portion 201. At the lower poleface of the same lamination, the dispositions of the solid and punched-out portions are reversed, so that a punched-out portion is situated on the left hand side of the lamination, as viewed in FIG. 13, while the solid portion 199 at this lower pole is to the right hand side of the lamination. A uniform half-density iron layer is achieved in the depleted region of the assembled rotor by every second lamination along the axial extent of the rotor being reversed during assembly of the rotor stack. Pole tips 196 and 197 are defined in the finally assembled rotor in similar manner to the arrangements previously described in relation to other Figures. Arrows 202 indicate a preferred grain direction for the material of the rotor.

Figure 14:
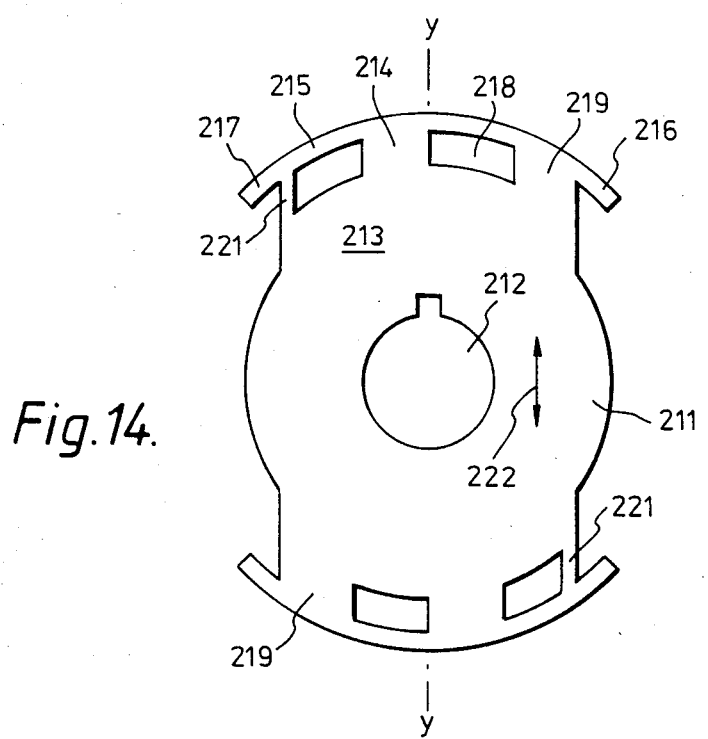
FIG. 14 is a similar view of an alternative configuration of rotor lamination, in which offset punching is again employed, but with a larger size of punched hole.

FIG. 14 shows an alternative embodiment of rotor lamination having offset punching. Items similar to items 191 to 202 of FIG. 13 are identified by corresponding reference numerals 211 to 222 in FIG. 14. In the arrangement of FIG. 14, the punched holes or apertures 218 are of greater circumferential or arcuate extent that the holes 198 of FIG. 13. In addition, the depleted region 214 of the lamination of FIG. 14 does not terminate in an open-ended punched-out portion, such as portion 201 of FIG. 13, but rather the punched hole 218 to the right hand side of the axis of symmetry indicated by y—y is spaced from the arcuate end of the depleted region by a wide portion or section 219, while the hole 218 to the left hand side of axis y—y is separated from the circumferential end of the depleted region by a narrow portion 221. As in the case of the arrangement of FIG. 13, the relative dispositions of the wide and narrow portions 219 and 221 relative to the axis y—y are reversed in the lower pole of lamination 211, as depicted in FIG. 14. In assembly of a rotor using these laminations, the uniform half-density iron layer in depletion region 214 is again achieved by each alternate lamination in the stack being turned through 180° about axis of symmetry y—y.

Figure 15:
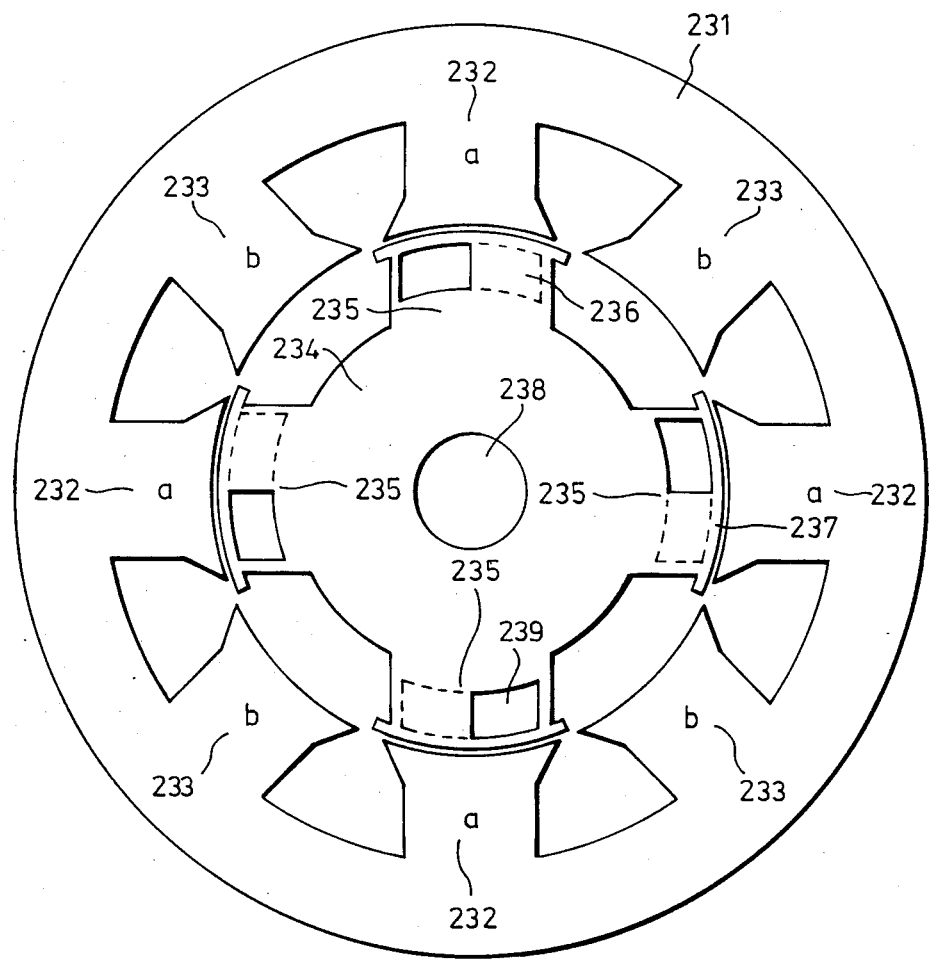
FIG. 15 is an end view of an eight stator pole, four rotor pole, two-phase self-starting reluctance motor embodying the principles of the present invention.

FIG. 15 shows an eight stator pole four rotor pole two-phase self-starting reluctance machine. Stator 231 has four stator poles 232, associated with phase 'a', and a further four poles 233, associated with phase 'b'. Rotor 234 is mounted by means of a shaft extending through central aperture 238. The rotor 234 has four poles 235. Each pole has a depleted iron region 236, for constriction of magnetic flux, and a pole face region 237, radially outwardly disposed from the depletion region 236. The depletion region is provided in a manner similar to that described in relation to FIGS. 13 and 14, namely by punching holes 239 in each lamination in an asymmetric configuration about a diametral axis of symmetry of the lamination extending transversely across it and passing through a pair of opposed poles. In the construction shown in FIG. 15, a single such hole 239 is punched in each pole, extending over substantially one-half of the circumferential or arcuate extent of the constriction region 236. As in the case of the arrangements of FIGS. 13 and 14, alternate laminations are reversed, so that a uniform depletion layer is provided in the assembled lamination stack.

In all of the configurations so far described, the poles and yoke may be separately formed, rather than the stator laminations each consisting of a yoke portion and integral poles. Such a separated configuration is especially favorable for the stator of a larger machine. The yoke may be formed from magnetically inferior, low-cost material, and the iron loss density therein may be reduced by augmenting the radial thickness of the yoke. This has the further effect of enhancing the structural stiffness and vibration characteristics of the machine. By contrast, the poles may then be formed by grain-oriented, higher cost material, so that higher fluxes may prevail in the waist sections of the poles and loss of magnetomotive force may be substantially minimized. The poles may then be assembled as bonded blocks, which may be slid into axial grooves or slideways in the yoke, of the type illustrated for pole 166 in FIG. 12. The pole windings are also placed in position preparatory to this assembly of the poles and yoke.

Figure 16:
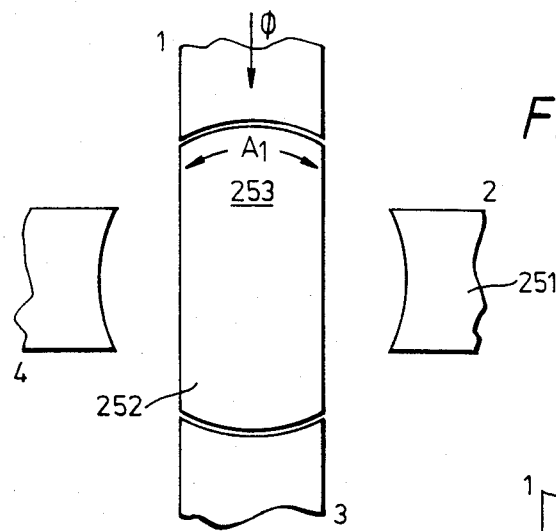
FIG. 16 is an end view of an idealized and simplified reluctance motor, having a low value of pole surface area.
Figure 17:
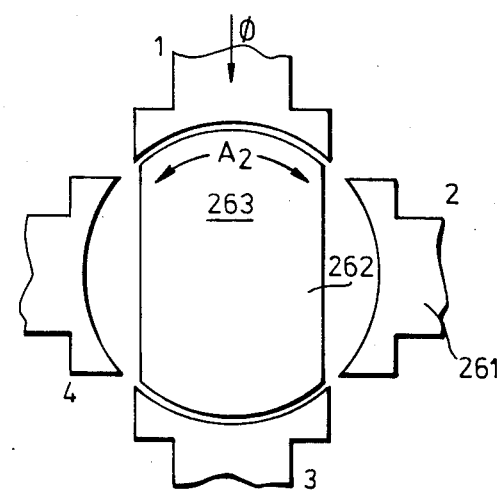
FIG. 17 is a similar view of a similar primitive reluctance machine, having a high value of pole surface area.

Considering noise and vibration characteristics in general, the invention results in a stiffer structure than conventional three or four phase reluctance machines. Lower forces having a slower time rate of increase are also experienced. Reverting to FIG. 15, in which a pair of forces is established by machine energization, the stator yoke is per force thicker and stiffer than that of a comparable six stator pole/four rotor pole three-phase machine, as it is required to carry more flux. The surface force density or normal magnetic traction on the poles is reduced by greater area of the pole shoes in this two-phase construction, as compared with a three-phase machine in which pole shoes would not be employed. The actual total force for a given flux is similarly reduced. FIG. 16 shows a primitive reluctance machine having a low value of pole surface area $A_1$. In this machine, there are four stator poles 251, while rotor 252 has two rotor poles 253. FIG. 17 shows a further similar primitive reluctance machine, but in this case the pole surface area $A_2$ has a relatively high value. In the machines of these Figures, the radial force is defined by:

$$\text{Force} = (B^2 A/2\mu_o) = (\phi^2/2\mu_o) \cdot (1/A)$$

where
 B is the flux density,
 $\phi$ is the flux, and
 $\mu_o$ is the permeability of free space.

Thus comparing the machines of FIGS. 16 and 17, if the pole area $A_2$ is twice the pole area $A_1$, then, for the same flux, the radial force in the machine of FIG. 17 will be one-half of that in the machine of FIG. 16. Due to the use of a longer working stroke in FIG. 17, the peak value of the tangential force will also be less than that in the arrangement of FIG. 16, in the inverse ratio of the areas $A_2$ and $A_1$. While the total flux excursion during the working stroke, and thus the work done, may be the same for the arrangements of FIGS. 16 and 17, the work is carried out over a longer arcuate extent in the arrangement of FIG. 17. These favorable characteristics arise in association with the saturable layer, which is required in the arrangement of FIG. 17, using for example one of the configurations previously described, if the growth of flux with angle is to be uniform. Pole tip tapering, as shown in a previous Figure, represents a further means available for control of the tangential force, and in particular, the rate of change of this force with rotor angle. Abrupt "switching type" steps of force may also be avoided by PWM control of the exciting currents, under the control of a shaft angle transducer.

A further feature achieved by the use of large area pole shoes is an augmentation of airgap permeance compared with that of a corresponding machine lacing this feature. Thus for the same magnetomotive force drop across the airgap, the airgap itself may be made larger, with a corresponding relaxation in the mechanical tolerances required, and/or a reduction in unbalanced forces and the associated noise arising from these.

Figure 18:
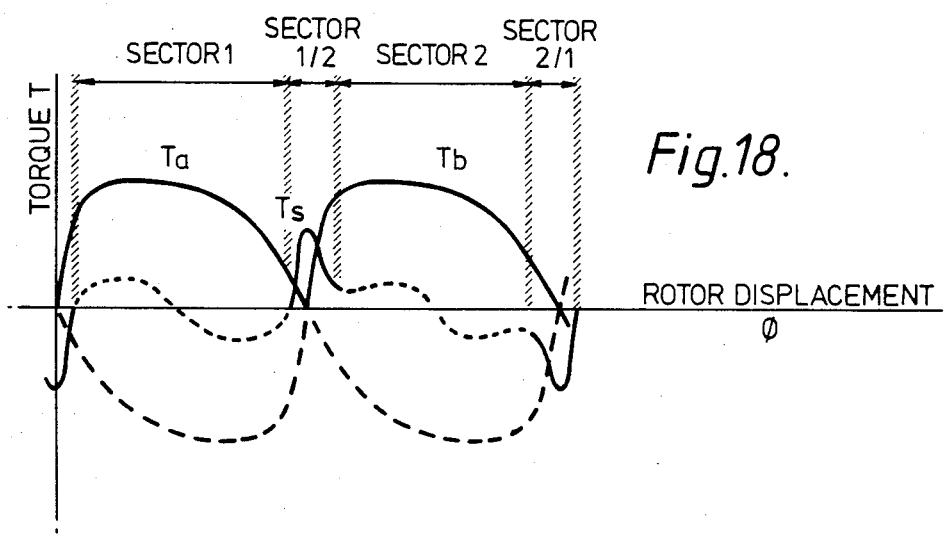
FIG. 18 is a reproduction of the torque against rotor angle diagram of FIG. 5, with various pertinent sectors of operation identified.

FIG. 18 is a reproduction of the torque-angle curve of FIG. 5, with different sectors of operation vis-a-vis motor starting identified as sectors 1, 1/2, 2 and 2/1. These sectors are also indicated on the periphery of the stator depicted in FIG. 19, with which FIG. 18 is best considered. These sectors are not to be regarded as precisely defined and their boundaries are indicated by the shade thick lines 302, these being intended to represent the gradual transition of the conditions applicable to one sector into those applicable to the neighboring sector. The machine of FIG. 19 has a stator 291 with stator poles 292 to 295, and a single rotor pole 296 is indicated, having a leading edge 297 and a trailing edge 298, in each case in regard to clockwise rotation of the rotor. A diametral center line of the pole is indicated by reference 301, this central axis of symmetry intercepting the poleface surface substantially midway long its circumferential extent between the leading and trailing poletips 297 and 298. The various starting sequences required to initiate rotor rotation in either the clockwise or counter-clockwise directions are set out in the table of FIG. 20, and are further explained in association with the developed views of FIG. 21, described below. So far as FIG. 20 is concerned, the sequence to be used will depend on the starting position of the rotor, here identified in dependence on the sector in which its center line 301 is located. The majority of the sequences will be self-explanatory, "a+b" indicating simultaneous energization of phases 'a' and 'b' to make use of the pole tip torque effect previously described. The phase energizations indicated by bracketed notation such as ['a'] refer to sequences where it is necessary to first of all move the rotor for a short distance in the opposite direction to that desired, so that it may be brought into a disposition where a normal energization of successive phases in sequence may take place. This feature is also set out in more detail in the following description of FIG. 21 in which the rotor pole diametrically opposite pole 296 is denoted by reference 306.

Figure 21A:
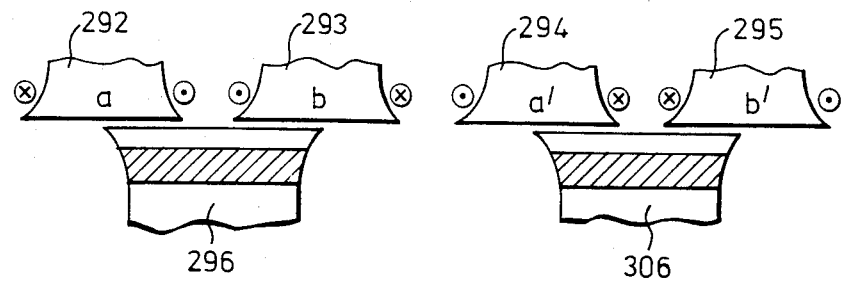

As shown in FIG. 21(a), the rotor poles 296 and 306 are initially partially overlapping the stator poles 292 to 295 of both phases 'a' and 'b', i.e. the center line 301 is in sector 2 for clockwise movement, corresponding to movement to the right in the present developed view. Normal energization of phase 'b' alone will produce a force tending to move the rotor to the right and by the time it has reached the position of zero force, i.e. the transition between $T_b$ and $T_a$ in the diagram of FIG. 18 where it is fully aligned with phase 'b', the rotor will have gained sufficient momentum to continue its movement to the right. Phase 'b' is then switched off, phase 'a' is energized and a normal switched reluctance motor operating strategy is then followed. Counter-clockwise rotation, i.e. movement to the left in FIG. 21, may also be initiated from the position shown by first of all exciting phase 'a', and then continuing with phase 'b' and a normal strategy.

Figure 19:
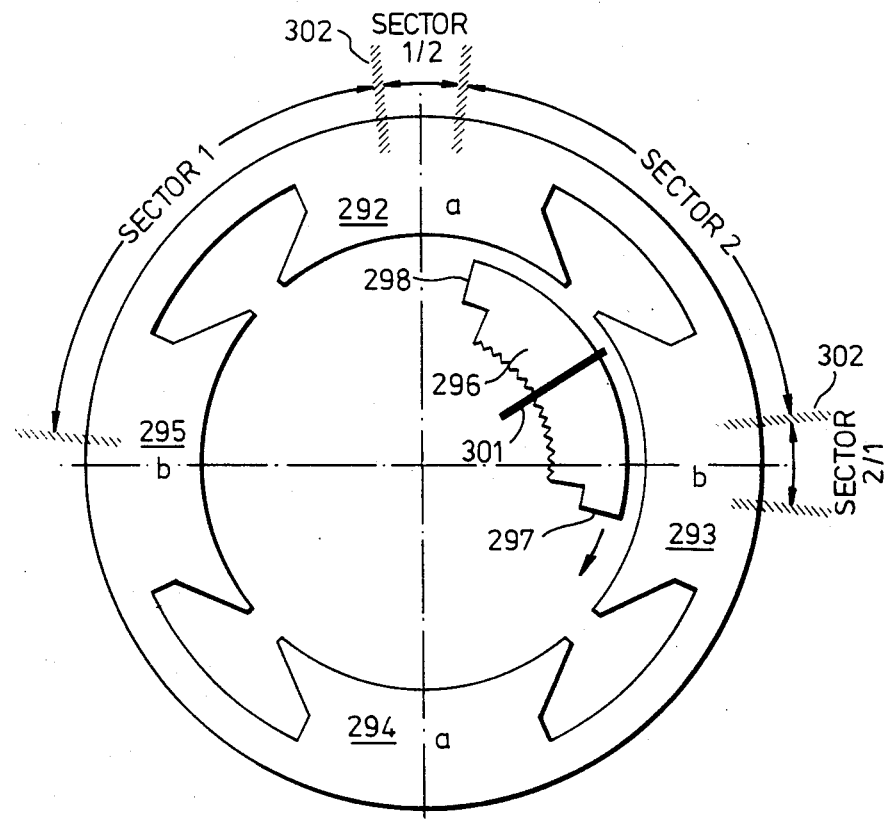
FIG. 19 is an end view of a stylized stator lamination and a rotor pole portion of an associated rotor pole lamination, with the sectors of operation identified on the diagram of FIG. 18 indicated around the periphery of the stator lamination.
Figure 21B:
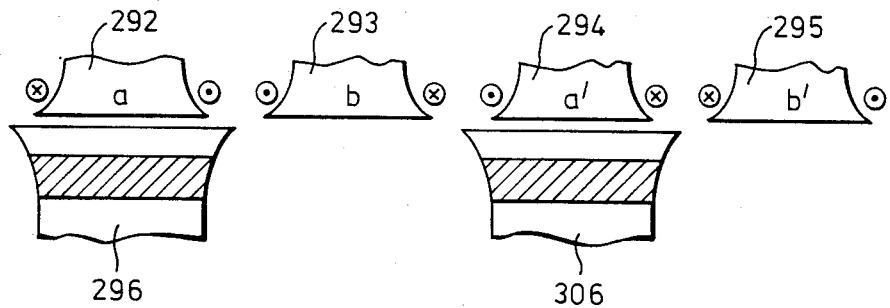

FIG. 21(b) shows the rotor poles initially fully aligned with stator poles a and a', i.e. in sector ½ with reference to FIG. 19. Phase 'a' and 'b' are excited together and produce a force tending to displace the rotor to the right. As the rotor moves to the right, the rotor poles start to overlap with stator poles b and b' and the level of the "normal" reluctance force which will be established by the excitation of a single phase alone starts to increase. Phase 'a' excitation may be held at a predetermined fixed level until the rotor has moved sufficiently far to the right for the normal reluctance force which would prevail were phase 'b' alone energized to be sufficient to ensure continued movement to the right. The phase 'a' excitation may then be switched off abruptly or alternatively it may be reduced in a programmed manner to match the increase in the normal reluctance force of phase 'b'. By the time the rotor has moved into full alignment with phase 'b', under the action of phase 'b' torque acting alone, it will have accumulated sufficient momentum to carry it through the following zero-torque point and into the field of influence of phase 'a', so that rotor displacement may continue with a normal operating strategy.

Figure 21C:
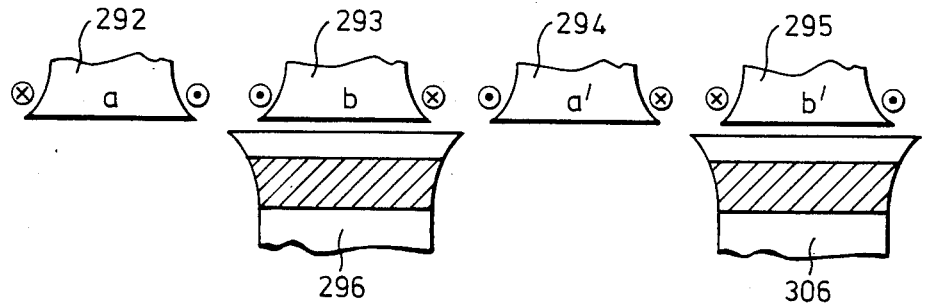

In the third configuration illustrated in FIG. 21(c), the rotor poles are initially aligned with phase 'b', i.e. poles b and b', i.e. in sector 2/1 as depicted in FIG. 19. Simultaneous excitation of phases 'a' and 'b' will produce a force tending to move the rotor to the left. If rotation in the counter-clockwise direction is in fact required, i.e. to the left in the developed view, then the procedure described in relation to FIG. 21(b) may be followed, in substantial mirror image, but if rotation to the right is in fact desired, then it is necessary to first of all bring the rotor into partial alignment with phase 'a'. As the rotor moves to the left, the rotor poles begin to overlap with stator poles a and a' and the normal reluctance force which would be established by excitation of phase 'a' alone, and which, in this instance, acts to the left, starts to increase. The torque of phase 'a' is, in this case, represented by the negative torque portion of the $T_a$ torque curve of FIG. 18, since at this stage reverse overlap or displacement is in question. In the same way as described in regard to FIG. 21(b), the phase 'a' excitation is again controlled and either abruptly switched off or decreased when the rotor poles reach a position in which they partially overlap both poles a and b. Continued excitation of phase 'b' will however, then decelerate the rotor, terminate its reverse movement, and draw it back again towards the right. The rotor is then again accelerated as it moves into alignment with phase 'b' until it has sufficient momentum to carry it over the following zero-torque region for normal operating by sequential excitation of phases 'a' and 'b'. It is important in starting from this disposition of the rotor that excitation of phase 'a' during the initial step to the left is terminated before the rotor has been accelerated to a speed sufficient to maintain its rotation in this direction. A favoured disposition for reversing the direction of rotor displacement is when the rotor poles overlap poles a and b half and half, i.e. a configuration similar to that of FIG. 21(a). The remaining starting sequences set out in FIG. 20 essentially represent only variants on the three basic starting sequences explained in detail in regard to FIG. 21 and will be immediately apparent from the Figures.

The implementation of starting strategies such as those described above requires more angular position information for the rotor than is customarily necessary in a conventional multi-phase switched reluctance motor. This information may be obtained by means of a shaft angle transducer of a type producing information of at least the level of an encoder or resolver. Alternatively the rotor position may be inferred by calculation from the phase current and voltage values. This arrangement is especially favored in that it removes the requirement for an angle transducer to be provided. The inferential function required may be incorporated in software implemented by logic means associated with the motor drive system. Since some computing facility or "intelligence" is required in any case in order to permit selection and execution of an appropriate starting strategy based on rotor position, the extra software needed for inferring rotor position has a relatively minimal effect on the cost of a drive system embodying the present invention.

Figure 22:
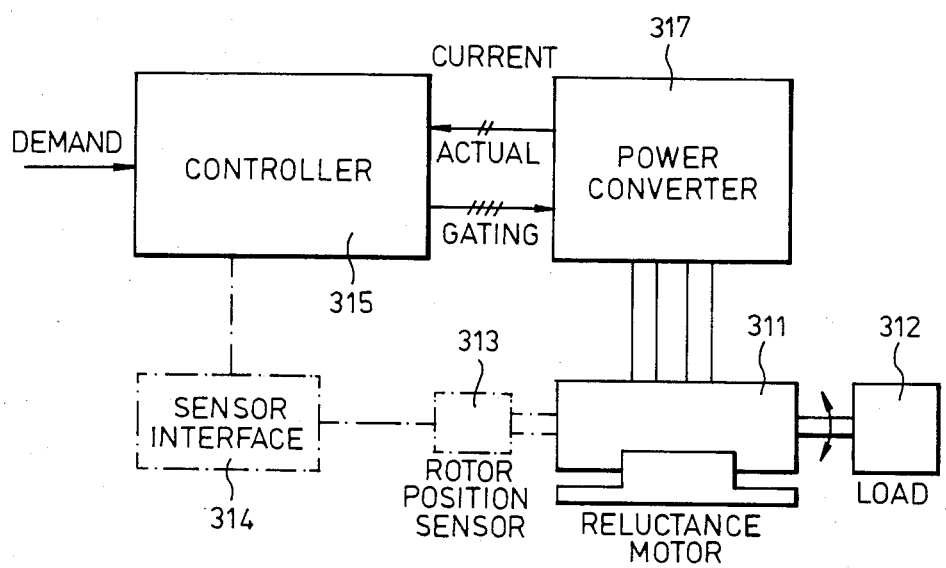
FIG. 22 is a blaock diagram of a variable reluctance motor drive system, which may incorporate a motor in accordance with the present invention.

FIG. 22 shows a drive system for a reluctance motor 311 driving a load 312. An optional shaft angle position sensor 313 provides an angle signal to a similarly optional sensor interface 314, which in turn provides an input to a reference waveform generator 315, this also having a set level or demand input for control of the motor. A desired current level signal is outputted from the generator 315, e.g. in the form of gating signals, and is forwarded to a PWM power converter 317. Feedback signals from the converter ensure that the actual currents closely track those desired. The sensor system 313, 314 may be substituted by an inferential feature as described above, for establishing rotor position.

Figure 23:
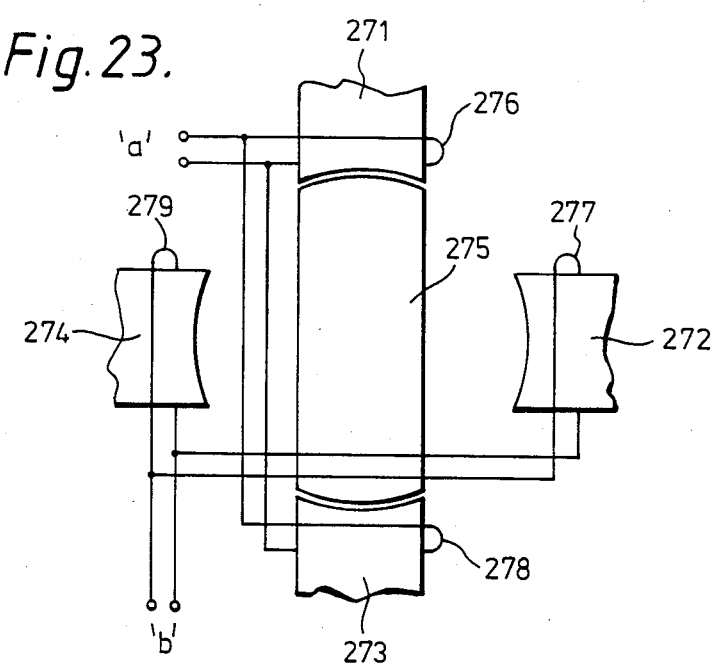
FIG. 23 shows in schematic form a winding connection arrangement intended to force equal fluxes in a machine incorporating the principles of the invention.

FIG. 23 shows a connection arrangement for the stator windings 276, 277, 278 and 279 of a machine having stator poles 271, 272, 273 and 274, and a rotor 275. The windings 276 and 278 of phase 'a' and the windings 277 and 279 of phase 'b' are connected in parallel, so that the rate of change of flux is forced to be the same in each pole of the same phase, and the radial forces acting on the rotor are thereby balanced.

The present invention offers a relatively simple single-stack two-phase motor construction offering inherently lower noise and vibration characteristics than many conventional reluctance motors. In conjunction with power circuit means described in a co-pending patent application Ser. No. 816866 entitled "Power supply systems for reluctance motors", an especially economic drive system may be provided, requiring as few as four main switching devices.

We claim:

1. A two-phase variable reluctance motor, comprising a stationary or driving member having a plurality of salient driving poles, the number of said poles being four or a multiple of four, a magnetizing winding for each driving pole, each said magnetizing winding being either a first phase winding or a second phase winding and alternate driving poles having windings of different phases so that the driving poles neighboring each driving pole carrying a first phase winding each carry a winding of the second phase and the driving poles neighboring each pole carrying a second phase winding each carry a winding of the first phase, and a movable or driven member having a plurality of movable or driven poles, the number of said driven poles being one-half of the number of driving poles, each driving poles having a poleface region, the extent of which in the direction of relative displacement of said driving and driven poles approaches the driving pole pitch, so that each poletip portion of each driving pole is disposed at a spacing in said direction of relative displacement of said driving and driven poles from a poletip portion of an adjacent driving pole, the minimum said spacing of said poletip portions being relatively short compared with the extent of the driving pole poleface regions in said direction of relative displacement, each driven pole having poletip portions of relatively high magnetic permeability and a saturating zone, said saturating zone extending over substantially the full extent of the pole in said direction of relative displacement and defining a constriction in the path presented to magnetic flux in operation of the motor, so that the greater part of the magnetomotive force produced by energization of a driving member magnetizing winding may be developed across said saturating zone, and each driven pole having a poleface region, the extent of which in said direction of relative displacement is related to that of the driving pole poleface regions, so that each poletip portion of a driven pole which is in alignment with a driving pole is disposed in the vicinity of both a poletip portion of said aligned driving pole and the poletip portion spaced therefrom of a driving pole neighboring said aligned driving pole, for the passage of fringing flux through said poletip portions of the driven pole on simultaneous excitation of said first and second phases, said fringing flux being relatively strong for the driven poletip portion in the vicinity of the poletip portions of driving poles of opposite polarity and being relatively weak for the driven poletip portion in the vicinity of the poletip portions of driving poles of the same polarity.

2. A two-phase variable reluctance motor, comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extent of the stator poleface regions, each rotor pole having poletip portions of relatively high magnetic permeability and a saturating zone, said saturating zone extending circumferentially over substantially the full extent of the pole and defining a constriction in the path presented to magnetic flux in operation of the motor, so that the greater part of the magnetomotive force produced by energization of a stator magnetizing winding may be developed across said saturating zone, and each rotor pole having a poleface region, the arcuate extent of which is related to that of the stator poleface regions, so that each poletip portion of a rotor pole which is in alignment with a stator pole is disposed in the vicinity of both a poletip portion of said aligned stator pole and the circumferentially-spaced poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity.

3. A motor according to claim 2, wherein said saturating zone of each rotor pole is formed from a material of lesser ferromagnetic density than pure iron.

4. A motor according to claim 2, wherein said rotor poles are formed by a plurality of laminations, and each said saturating zone is a rotor pole region of reduced ferromagnetic density defined by apertured portions of said laminations.

5. A drive system incorporating a variable reluctance motor, the motor comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extend of the stator poleface regions, each rotor pole having poletip portions of relatively high magnetic permeability and a saturating zone, said saturating zone extending circumferentially over substantially the full extent of the pole and defining a constriction in the path presented to magnetic flux in operation of the motor, so that the greater part of the magnetomotive force produced by energization of a stator magnetizing winding may be developed across said saturating zone, each rotor pole having a poleface region, the arcuate extent of which is related to that of the stator poleface regions, so that each poletip portion of a rotor pole which is in alignment with a stator pole is disposed in the vicinity of both a poletip portion of said aligned stator pole and the circumferentially-spaced poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity, at least each said rotor poletip being of high magnetic permeability, and the system comprising control means for energizing said magnetizing windings and for initiating a selected one of a plurality of starting sequences in dependence on rotor standstill position at start-up and the desired direction of rotor rotation.

6. A motor according to claim 4, wherein each rotor pole has a substantially continuous poleface surface layer of full ferromagnetic density.

7. A two-phase variable reluctance motor, comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extent of the stator poleface regions, each rotor pole having a saturating zone extending circumferentially over substantially the full extent of the pole and defining a constriction in the path presented to magnetic flux in operation of the motor, so that the greater part of the magnetomotive force produced by energization of a stator magnetizing winding may be developed across said saturating zone, each rotor pole having a poleface region, the arcuate extent of which is in excess of the stator pole pitch and is related to the arcuate extent of the stator poleface regions, so that such poletip portion of a rotor pole which is in alignment with a stator pole is substantially aligned with a poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity.

8. A motor according to claim 2, wherein each rotor pole has a waist portion and said poletip portions extend circumferentially beyond said waist portion.

9. A motor according to claim 2, wherein all the magnetising windings of said first phase are connected in parallel and all the magnetising windings of said second phase are also connected in parallel.

10. A drive system incorporating a variable reluctance motor, the motor comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extent of the stator poleface regions, each rotor pole having poletip portions of relatively high magnetic permeability and a saturating zone, said saturating zone extending circumferentially over substantially the full extent of the pole and defining a constriction in the path presented to magnetic flux in operation of the motor, so that the greater part of the magnetomotive force produced by energization of a stator magnetizing winding may be developed across said saturating zone, and each rotor pole having a poleface region, the arcuate extent of which is related to that of the stator poleface regions, so that each poletip portion of a rotor pole which is in alignment with a stator pole is disposed in the vicinity of both a poletip portion of said aligned stator pole and the circumferentially-spaced poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity.

11. A drive system incorporating a variable reluctance motor, the motor comprising a stator having a plurality of salient stator poles, the number of said poles being four or a multiple of four, a magnetizing winding for each stator pole, each said magnetizing winding being either a first phase winding or a second phase winding and alternate stator poles having windings of different phases so that the stator poles neighhboring each stator pole carrying a first phase winding each carry a winding of the second phase and the stator poles neighboring each pole carrying a second phase winding each carry a winding of the first phase, and a rotor having a plurality of rotor poles, the number of said rotor poles being one-half of the number of stator poles, each stator pole having a poleface region, the arcuate extent of which approaches the stator pole pitch, so that each poletip portion of each stator pole is disposed at a circumferential spacing from a poletip portion of an adjacent stator pole, the minimum circumferential spacing of said poletip portions being relatively short compared with the arcuate extent of the stator poleface regions, each rotor pole having a circumferentially extending saturating zone defining a constriction in the path presented to magnetic flux in operation of the motor, so that the greater part of the magnetomotive force produced by energization of a stator magnetizing winding may be developed across said saturating zone, and each rotor pole having a poleface region, the arcuate extent of which is related to that of the stator poleface regions, so that each poletip portion of a rotor pole which is in alignment with a stator pole is disposed in the vicinity of both a poletip portion of said aligned stator pole and the circumferentially-spaced poletip portion of a stator pole neighboring said aligned stator pole, for the passage of fringing flux through said poletip portions of the rotor pole on simultaneous excitation of said first and second phases, said fringing flux being relatively strong for the rotor poletip portion in the vicinity of the poletip portions of stator poles of opposite polarity and being relatively weak for the rotor poletip portion in the vicinity of the poletip portions of stator poles of the same polarity, and the system comprising control means for energizing said magnetizing windings and for initiating a selected one of a plurality of starting sequences in dependence on rotor standstill position at start-up and the desired direction of rotor rotation.

12. A drive system according to claim 11, wherein said control means is adapted to infer rotor position from the values of the phase currents and voltages present on energization of the motor to initiate a said selected one of said starting sequences.

13. A drive system according to claim 11, wherein the system comprises sensor means for producing a signal indicative of rotor position and said control means is responsive to said rotor position signal to initiate a said selected one of said starting sequences.

* * * * *